United States Patent
Brady et al.

(10) Patent No.: US 12,338,536 B2
(45) Date of Patent: Jun. 24, 2025

(54) APPLIED MAGNETIC FIELD SYNTHESIS AND PROCESSING OF IRON NITRIDE MAGNETIC MATERIALS

(71) Applicants: Regents of the University of Minnesota, Minneapolis, MN (US); UT-BATTELLE, LLC, Oak Ridge, TN (US)

(72) Inventors: Michael P. Brady, Oak Ridge, TN (US); Orlando Rios, Knoxville, TN (US); YanFeng Jiang, Berkeley, CA (US); Gerard M. Ludtka, Oak Ridge, TN (US); Craig A. Bridges, Knoxville, TN (US); Jian-Ping Wang, Shoreview, MN (US); Xiaowei Zhang, Minneapolis, MN (US); Lawrence F. Allard, Knoxville, TN (US); Edgar Lara-Curzio, Lenoir City, TN (US)

(73) Assignee: Regents of the University of Minnesota, Minneapolis, MN (US)

(*) Notice: Subject to any disclaimer, the term of this patent is extended or adjusted under 35 U.S.C. 154(b) by 434 days.

(21) Appl. No.: 17/182,857

(22) Filed: Feb. 23, 2021

(65) Prior Publication Data
US 2021/0180174 A1    Jun. 17, 2021

Related U.S. Application Data

(63) Continuation of application No. 15/840,747, filed on Dec. 13, 2017, now Pat. No. 10,961,615, which is a
(Continued)

(51) Int. Cl.
C23C 8/26    (2006.01)
C01B 21/06    (2006.01)
(Continued)

(52) U.S. Cl.
CPC ............ *C23C 8/26* (2013.01); *C01B 21/0622* (2013.01); *C21D 1/26* (2013.01); *C21D 6/00* (2013.01);
(Continued)

(58) Field of Classification Search
None
See application file for complete search history.

(56) References Cited

U.S. PATENT DOCUMENTS 5,032,947 A    7/1991    Li et al.
5,068,147 A    11/1991    Hori et al.
(Continued)

FOREIGN PATENT DOCUMENTS

CN    1156516 A    8/1997
CN    1621549 A    6/2005
(Continued)

OTHER PUBLICATIONS

Sugita et al., "Giant Magnetic Moment and Other Magnetic Properties of Epitaxially Grown Fe16N2 Single-Crystal Films (Invited)," Journal of Applied Physics, vol. 70, No. 10, Nov. 15, 1991, pp. 5977-5982.
(Continued)

*Primary Examiner* — Devang R Patel
(74) *Attorney, Agent, or Firm* — BakerHostetler

(57) ABSTRACT

A method may include annealing a material including iron and nitrogen in the presence of an applied magnetic field to form at least one $Fe_{16}N_2$ phase domain. The applied magnetic field may have a strength of at least about 0.2 Tesla (T).

34 Claims, 7 Drawing Sheets

Related U.S. Application Data continuation of application No. 14/754,284, filed on Jun. 29, 2015, now Pat. No. 9,994,949.

(60) Provisional application No. 62/019,046, filed on Jun. 30, 2014.

(51) Int. Cl.
| | | |
|---|---|---|
| *C21D 1/26* | (2006.01) | |
| *C21D 6/00* | (2006.01) | |
| *C22C 33/00* | (2006.01) | |
| *C22C 38/00* | (2006.01) | |
| *C23C 28/00* | (2006.01) | |
| *H01F 1/06* | (2006.01) | |
| *H01F 1/047* | (2006.01) | |

(52) U.S. Cl.
CPC .............. *C22C 33/00* (2013.01); *C22C 38/00* (2013.01); *C22C 38/001* (2013.01); *C23C 28/322* (2013.01); *C23C 28/34* (2013.01); *H01F 1/065* (2013.01); *C01P 2002/72* (2013.01); *C01P 2006/42* (2013.01); *H01F 1/047* (2013.01)

(56) References Cited

U.S. PATENT DOCUMENTS

| | | | |
|---|---|---|---|
| 5,137,588 A | 8/1992 | Wecker et al. | |
| 5,330,554 A | 7/1994 | Koyano et al. | |
| 5,449,417 A | 9/1995 | Shimizu et al. | |
| 6,139,765 A | 10/2000 | Kitazawa et al. | |
| 6,217,672 B1 | 4/2001 | Zhang | |
| 6,319,485 B1 | 11/2001 | Nagatomi et al. | |
| 6,457,629 B1 | 10/2002 | White | |
| 6,778,358 B1 | 8/2004 | Jiang et al. | |
| 6,841,259 B1 | 1/2005 | Takahashi et al. | |
| 7,238,439 B2 | 7/2007 | Sasaki et al. | |
| 9,715,957 B2 | 7/2017 | Wang et al. | |
| 9,994,949 B2 | 6/2018 | Brady et al. | |
| 2002/0117102 A1 | 8/2002 | Takahashi et al. | |
| 2002/0191354 A1 | 12/2002 | Yoshikawa et al. | |
| 2002/0197530 A1 | 12/2002 | Tani et al. | |
| 2004/0089564 A1* | 5/2004 | Kuse | G11B 5/70615 |
| 2005/0123754 A1 | 6/2005 | Masada et al. | |
| 2005/0208320 A1 | 9/2005 | Masada et al. | |
| 2006/0105170 A1 | 5/2006 | Dobson et al. | |
| 2006/0112873 A1 | 6/2006 | Uchida et al. | |
| 2006/0131537 A1 | 6/2006 | Masada et al. | |
| 2007/0111039 A1 | 5/2007 | Ishikawa et al. | |
| 2008/0166584 A1 | 7/2008 | Deligianni et al. | |
| 2009/0042063 A1 | 2/2009 | Inoue et al. | |
| 2009/0087688 A1 | 4/2009 | Masaki | |
| 2010/0035086 A1 | 2/2010 | Inoue et al. | |
| 2010/0104767 A1 | 4/2010 | Sskuma et al. | |
| 2010/0288964 A1 | 11/2010 | Pirich et al. | |
| 2011/0059005 A1 | 3/2011 | Sankar et al. | |
| 2011/0074531 A1 | 3/2011 | Yamashita et al. | |
| 2012/0090543 A1 | 4/2012 | Cheong | |
| 2012/0145944 A1 | 6/2012 | Komuro et al. | |
| 2012/0153212 A1 | 6/2012 | Liu | |
| 2013/0126775 A1 | 5/2013 | Abe et al. | |
| 2013/0140076 A1 | 6/2013 | Lee et al. | |
| 2013/0252004 A1 | 9/2013 | Maeda et al. | |
| 2014/0001398 A1 | 1/2014 | Takahashi et al. | |
| 2014/0008446 A1 | 1/2014 | Carr | |
| 2014/0085023 A1 | 3/2014 | Takahashi et al. | |
| 2014/0290434 A1 | 10/2014 | Matthiesen | |
| 2014/0294657 A1 | 10/2014 | Yamamoto et al. | |
| 2014/0299810 A1 | 10/2014 | Wang et al. | |
| 2015/0380135 A1 | 12/2015 | Wang et al. | |
| 2015/0380158 A1 | 12/2015 | Brady et al. | |
| 2016/0042846 A1 | 2/2016 | Wang et al. | |
| 2016/0042849 A1 | 2/2016 | Wang et al. | |
| 2016/0141082 A1 | 5/2016 | Wang et al. | |
| 2016/0189836 A1 | 6/2016 | Takahashi et al. | |

FOREIGN PATENT DOCUMENTS

| | | |
|---|---|---|
| CN | 101607701 B * | 1/2011 |
| CN | 102576591 A | 7/2012 |
| CN | 103339694 A | 10/2013 |
| CN | 103827986 A | 5/2014 |
| CN | 105849834 A | 8/2016 |
| EP | 0509361 A2 | 10/1992 |
| EP | 0633581 A1 | 1/1995 |
| EP | 0994493 A2 | 4/2000 |
| EP | 1548760 A2 | 6/2005 |
| EP | 1675133 A2 | 6/2006 |
| EP | 2492927 A1 | 8/2012 |
| EP | 2666563 A1 | 11/2013 |
| EP | 2696356 A1 | 2/2014 |
| JP | 61-143557 A | 7/1986 |
| JP | 61-157634 A | 7/1986 |
| JP | 62-232101 A | 10/1987 |
| JP | 63-132701 A | 6/1988 |
| JP | 02-173209 A | 7/1990 |
| JP | 02-212320 A | 8/1990 |
| JP | 03-100124 A | 4/1991 |
| JP | 04-217305 A | 8/1992 |
| JP | 05-269503 A | 10/1993 |
| JP | 05-311390 A | 11/1993 |
| JP | 05-326239 A | 12/1993 |
| JP | 06-096947 A | 4/1994 |
| JP | 06-267722 A | 9/1994 |
| JP | 06-311390 A | 11/1994 |
| JP | 2000-176513 A | 6/2000 |
| JP | 2001-135508 A | 5/2001 |
| JP | 2001-176715 A | 6/2001 |
| JP | 2002-334695 A | 11/2002 |
| JP | 2004-319923 A | 11/2004 |
| JP | 2005-183932 A | 7/2005 |
| JP | 2007-070669 A | 3/2007 |
| JP | 2007-273038 A | 10/2007 |
| JP | 2008-311518 A | 12/2008 |
| JP | 2009-259402 A | 11/2009 |
| JP | 2012-246174 A | 12/2012 |
| JP | 2013-069926 A | 4/2013 |
| JP | 2013-080922 A | 5/2013 |
| KR | 10-2012-0091091 A | 8/2012 |
| TW | 272293 B | 3/1996 |
| TW | I303072 B | 11/2008 |
| TW | 201249564 B | 12/2012 |
| TW | 201447934 A | 12/2014 |
| WO | 2011/049080 A1 | 4/2011 |
| WO | 2012/159096 A2 | 11/2012 |
| WO | 2013/026007 A2 | 2/2013 |
| WO | 2013/042721 A1 | 3/2013 |
| WO | 2013/090895 A1 | 6/2013 |
| WO | 2014/124135 A2 | 8/2014 |
| WO | 2014/210027 A1 | 12/2014 |
| WO | 2015/148810 A1 | 10/2015 |
| WO | 2016/022685 A1 | 2/2016 |
| WO | 2016/022711 A1 | 2/2016 |
| WO | 2016/122712 A1 | 8/2016 |
| WO | 2016/122971 A1 | 8/2016 |
| WO | 2016/122987 A1 | 8/2016 |

OTHER PUBLICATIONS

Sugita et al., "Magnetic and Electrical Properties of Single-Phase, Single-Crystal Fe16N2 Films Epitaxially Grown by Molecular Beam Epitaxy (Invited)," Journal of Applied Physics, vol. 79, No. 8, Apr. 15, 1996, pp. 5576-5581.

Sugita et al., "Magnetic and Mossbauer Studies of Single-Crystal Fe16N2 and Fe—N Martensite Films Epitaxially Grown by Molecular Beam Epitaxy (Invited)," Journal of Applied Physics, vol. 76, No. 10, Nov. 15, 1994, pp. 6637-6641.

(56) References Cited

OTHER PUBLICATIONS

Sun et al., "Epitaxial Single Crystal Fe16N2 Films Grown by Facing Targets Sputtering," Journal of Applied Physics, vol. 79, No. 8, Apr. 15, 1996, pp. 5440-5442.

Takahashi et al., "Alpha"-Fe16N2 Problem-Giant Magnetic Moment Or Not", Journal of Magnetism and Magnetic Materials, vol. 208, No. 3, Jan. 11, 2000, pp. 145-157.

Takahashi et al., "Ferromagnetic Resonance Studies of Fe16N2 Films with a Giant Magnetic Moment," Journal of Applied Physics, vol. 73, No. 10, May 15, 1993, pp. 6060-6062.

Takahashi et al., "Growth Mechanism of FeN Films by Means of an Atmospheric Pressure Halide Chemical Vapor Deposition," Materials Chemistry and Physics, vol. 65, Jan. 18, 2000. pp. 113-116.

Takahashi et al., "Impurity effect of carbon on structure and saturation magnetization of Fe—N films," Journal of Magnetism and Magnetic Materials, vol. 210, Sep. 1, 1999, pp. 333-340.

Takahashi et al., "Magnetic Moment of Alpha"-Fe16N2 Films (Invited)", Journal of Applied Physics, vol. 76, No. 10, Nov. 15, 1994, pp. 6642-6647.

Takahashi et al., "Magnetocrystalline Anisotropy for alfa"-Fe—C and alfa"-Fe—N Films," IEEE Transactions on Magnetics, vol. 37, No. 4, Jul. 2001, pp. 2179-2181.

Takahashi et al., "New Soft Magnetic Material of alfa'-Fe—C With High Bs," Journal of Magnetism and Magnetic Materials, vol. 239, Nos. 1-3, Feb. 1, 2002, pp. 479-483.

Takahashi et al., "Perpendicular Uniaxial Magnetic Anisotropy of Fe16N2(001) Single Crystal Films Grown by Molecular Beam Epitaxy," IEEE Transactions on Magnetics, vol. 35, No. 5, Sep. 1999, pp. 2982-2984.

Takahashi et al., "Preparation of FeN Thin Films by Chemical Vapor Deposition Using a Chloride Source," Materials Letters, vol. 42, Mar. 2000, pp. 380-382.

Takahashi et al., "Structure and Magnetic Moment of alfa"-Fe16N2 Compound Films: Effect of Co and H on Phase Formation (Invited)," Journal of Applied Physics, vol. 79, No. 8, Apr. 15, 1996, pp. 5564-5569.

Takahashi et al., "Structure and Magnetic Moment of Fe16N2 Sputtered Film," Journal of Magnetism and Magnetic Materials, vol. 174, Jun. 12, 1997, pp. 57-69.

Takahashi, "Discovery of Fe16N2 with Giant Magnetic Moment and Its Future View," IEEE Translation Journal on Magnetics in Japan, vol. 6, No. 12, Dec. 1991, pp. 1024-1038.

Tanaka et al., "Electronic Band Structure and Magnetism of Fe16N2 Calculated by the FLAPW Method," Physical Review B, vol. 62, No. 22, Dec. 1, 2000, pp. 15042-15046.

Tang et al., "Formation of Nanocrystalline Fe—N—B—Cu Soft Magnetic Ribbons," Journal of Non-Crystalline Solids, vol. 337, Sep. 9, 2003, pp. 276-279.

Tickle et al., "Magnetic and Magnetomechanical Properties of Ni2MnGa," Journal of Magnetism and Magnetic Materials, vol. 195, Feb. 2, 1999, pp. 627-638.

Tijssens et al., "Towards an Improved Continuum Theory for Phase Transformations," Materials Science and Engineering, vol. 378, Sep. 23, 2003, pp. 453-458.

Tomioka et al., "Iron Nitride Powder Produced as Substitute for Rare Metal," Nikkei Technology, Mar. 7, 2011, 2 pp.

Tong et al., "Low Temperature Wafer Direct Bonding," Journal of Microelectromechanical Systems, vol. 3, No. 1, Mar. 1994, pp. 29-35.

Toops et al., "Pre-Oxidized and Nitrided Stainless Steel Alloy Foil for Proton Exchange Membrane Fuel Cell Bipolar Plates. Part 2: Single-Cell Fuel Evaluation of Stamped Plates," Journal of Power Sources, vol. 195, Mar. 19, 2010, pp. 5619-5627.

Tsubakino et al., "Formation of Fe16N2 in iron sheet by an ion implantation method," Materials Chemistry and Physics 54, Elsevier, Jul. 1998, pp. 301-304.

Tsubakino et al., "High resolution transmission electron microscopic study of the formation of Fe16N2 in bulk iron by ion implantation," Material Letters 26, Elsevier, Feb. 1996, pp. 155-159.

Tsuchiya et al., "Spin Transition in Magnesiowustite in Earth's Lower Mantle," Physical Review Letters, vol. 94, May 18, 2006, 4 pp.

U.S. Appl. No. by Wang et al., filed Sep. 27, 2016. U.S. Appl. No. 15/129,439.

U.S. Appl. No. by Wang et al., filed Aug. 8, 2014. U.S. Appl. No. 62/035,245.

U.S. Appl. No. by Wang et al., filed Aug. 8, 2014. U.S. Appl. No. 62/035,230.

U.S. Appl. No. by Wang et al., filed Jan. 26, 2015. U.S. Appl. No. 62/107,733.

U.S. Appl. No. by Wang et al., filed Jan. 26, 2015. U.S. Appl. No. 62/107,748.

U.S. Appl. No. by Wang et al., filed Jan. 26, 2015. U.S. Appl. No. 62/107,700.

U.S. Appl. No. by Wang et al., filed Jun. 27, 2013. U.S. Appl. No. 61/840,221.

U.S. Appl. No. by Wang et al., filed Jun. 27, 2013. U.S. Appl. No. 61/840,248.

Uchida et al., "Magnetocrystalline Anisotropy Energies of Fe16N2 and Fe16C2," Journal of Magnetism and Magnetic Materials, vol. 310, Nov. 15, 2006, pp. 1796-1798.

Uijttewaal et al., "Understanding the Phase Transitions of the Ni2MnGa Magnetic Shape Memory System from First Principles," Physical Review Letters, vol. 102, Jan. 23, 2009, 4 pp.

Van Genderen et al., "Atom Probe Analysis of the First Stage of Tempering of Iron-Carbon-Nitrogen Martensite," Zeitschrift Fur Metallkunde, vol. 88, No. 5, May 1997, pp. 401-409.

Van Voorthuysen et al., "Low-Temperature Extension of the Lehrer Diagram and the Iron-Nitrogen Phase Diagram," Metallurgical and Materials Transactions A: Physical Metallurgy and Materials Science, vol. 33A, No. 8, Aug. 2002, pp. 2593-2598.

Vasil'Ev et al., "Structural and Magnetic Phase Transitions in Shape-Memory Alloys Ni2+xMn1-xGa," Physical Review B: Condensed Matter and Materials Physics, vol. 59. No. 2, Jan. 1, 1999, pp. 1113-1120.

Wallace et al., "Enhanced Fe Moment in Nitrogen Martensite and Fe16N2 (Invited)," Journal of Applied Physics, vol. 76, No. 10, Nov. 15, 1994, pp. 6648-6652.

Wang et al., "Fabrication of Fe16N2 Films by Sputtering Process and Experimental Investigation of Origin of Giant Saturation Magnetization in Fe16N2," IEEE Transactions on Magnetics, vol. 48, No. 5, May 2012, pp. 1710-1717.

Wang et al., "Growth, Structural, and Magnetic Properties of Iron Nitride Thin Films Deposited by de Magnetron Sputtering," Applied Surface Science, vol. 220, May 20, 2003, pp. 30-39.

Wang et al., "Properties of a New Soft Magnetic Material," Nature, vol. 407, Sep. 14, 2000, pp. 150-151.

Wang et al., "Searching, Fabricating and Characterizing Magnetic Materials With Giant Saturation Magnetization," TMRC 2014, Aug. 11, 2014, 2 pp.

Wang, "FePt Magnetic Nanoparticles and Their Assembly for Future Magnetic Media," Proceedings of the IEEE, vol. 96, No. 11, Nov. 2008, pp. 1847-1863.

Watanabe et al., "A New Challenge: Grain Boundary Engineering for Advanced Materials by Magnetic Field Application," Journal of Materials Science, vol. 41, No. 23, Oct. 24, 2006 (online), pp. 7747-7759.

Watanabe et al., "Perpendicular Magnetization of Epitaxial FePt(001) Thin Films with High Squareness and High Coercive Force," Japanese Journal of Applied Physics, vol. 35, No. 10A, Oct. 1, 1996, pp. 1264-1267.

Weber et al., "Search for Giant Magnetic Moments in Ion-Beam-Synthesized Alpha"-Fe16N2," Thin Solid Films, vol. 279, Jun. 1996, pp. 216-220.

Wedel et al., "Low Temperature Crystal Structure of Ni—Mn—Ga Alloys," Journal of Alloys and Compounds, vol. 290, Aug. 30, 1999 pp. 137-143.

Wehrenberg et al., "Shock Compression Response of Alpha-Fe16N2 Nanoparticles," Journal of Applied Physics, vol. 111, No. 8, Apr. 23, 2012, 8 pp.

(56) References Cited

OTHER PUBLICATIONS

Muhlethaler et al., "Improved Core-Loss Calculation for Magnetic Components Employed in Power Electronic Systems," IEEE Transactions on Power Electronics, vol. 27, No. 2, Feb. 2012, pp. 964-973.

Murata et al., "Physical Properties of Steel and Nitrogen," Japan, Agne Gijutsu Center Inc., Dec. 15, 2005, 8 pp.

Nakajima et al., "Formation of Ferromagnetic Iron Nitrides in Iron Thin Films by High-Dose Nitrogen Ion Implantation," Journal of Applied Physics, vol. 65, No. 11, Jun. 1, 1989, pp. 4357-4361.

Nakajima et al., "Large Magnetization Induced in Single Crystalline Iron Films by High-Dose Nitrogen Implantation," Applied Physics Letters, vol. 56, No. 1, Jan. 1, 1990, pp. 92-94.

Nakajima et al., "Nitrogen-Implantation-Induced Transformation of Iron to Crystalline Fe16N2 in Epitaxial Iron Films," Applied Physics Letters, vol. 54, No. 25, Jun. 19, 1989, pp. 2536-2538.

Nelson, "Epitaxial Growth From The Liquid State and Its Application To The Fabrication of Tunnel and Laser Diodes," RCA Review, vol. 24, No. 4, Dec. 1963, pp. 603-615.

Nimura et al., "Facing Targets Sputtering System for Depositing Co—Cr Perpendicular Magnetic Recording Media," Journal of Vacuum Science Technology, vol. 5, No. 1, Jan. 1987, pp. 109-110.

Ohtani et al., "Magnetic Properties of Mn—Al—C Permanent Magnet Alloys," IEEE Transactions on Magnetics, vol. MAG-13, No. 5, Sep. 1977, pp. 1328-1330.

Okamoto et al., "Characterization of Epitaxially Grown Fe—N Films by Sputter Beam Method," Journal of Applied Physics, vol. 79, No. 3, Feb. 1, 1996, pp. 1678-1683.

Okamoto et al., "Crystal Distortion and the Magnetic Moment of Epitaxially Grown alfa"-Fe16N2," Journal of Magnetism and Magnetic Materials, vol. 208, Jul. 12, 1999, pp. 102-114.

Oku et al., "Small-Angle Polarized Neutron Scattering Study of Spherical Fe16N2 Nano-Particles for Magnetic Recording Tape," Physica B, vol. 404, Sep. 1, 2009, pp. 2575-2577.

Okunev et al., "The Low-Temperature Electric Conductivity of YBaCuO and LaSrMnO Dielectric Films Obtained by a Pulsed Laser Sputter Deposition Technique," Technical Physics Letters, vol. 26, No. 10, May 6, 2000, pp. 903-906.

Opeil et al., "Combined Experimental and Theoretical Investigation of the Premartensitic Transition in Ni2MnGa," Physical Review Letters, vol. 100, Apr. 25, 2008, 4 pp.

Ortiz et al., "Epitaxial Fe16N2 Films Grown by Sputtering," Applied Physics Letters, vol. 65. No. 21, Nov. 21, 1994, pp. 2737-2739.

Osaka et al., "A Soft Magnetic CoNiFe Film With High Saturation Magnetic Flux Density and Low Coercivity," Nature, vol. 392, Apr. 23, 1998, pp. 796-798.

Paseka et al., "Structure and Magnetic Properties of Ball-Milled Iron Nitride Powders," Journal of Alloys and Compounds, vol. 274, Mar. 10, 1998, pp. 248-253.

Pauling, "The Nature of the Interatomic Forces in Metals," Physical Review, vol. 54, Dec. 1, 1938, pp. 899-904.

Perdew et al., "Generalized Gradient Approximation Made Simple," Physical Review Letters, vol. 77, No. 18, Oct. 28, 1996, pp. 3865-3868.

Perdew et al., "Self-Interaction Correction to Density-Functional Approximations for Many-Electron Systems," Physical Review B, vol. 23, No. 10, May 15, 1981, pp. 5048-5079.

Pickett et al., "Reformulation of the LDA + U Method for a Local-Orbital Basis," Physical Review B, vol. 58, No. 3, Jul. 15, 1998, pp. 1201-1209.

Ping et al., "Partitioning of Ga and Co Atoms in a Fe3B/Nd2Fe14B Nanocomposite Magnet," Journal of Applied Physics, vol. 83, No. 12, Jun. 15, 1998, pp. 7769-7775.

Pugaczow A-Michalska et al., "Electronic Structure and Magnetic Properties of Ni2MnGa1-xGex and Disordered Ni2MnSn Heusler Alloys," Acta Physica Polonica A, vol. 115, No. 1, Jan. 2009, pp. 241-243.

Qian et al., "NiZn Ferrite Thin Films Prepared by Facing Target Sputtering," IEEE Transactions Magnetics, vol. 33, No. 5, Sep. 1997, pp. 3748-3750.

Qiu et al., "In Situ Magnetic Field Alignment of Directly Ordered L10 FePt Nanoparticles," Applied Physics Letters, vol. 89, Nov. 29, 2006, 3 pp.

Qiu et al., "Monodispersed and Highly Ordered L10 FePt Nanoparticles Prepared in the Gas Phase," Applied Physics Letters, vol. 88, May 9, 2006, 3 pp.

Qiu et al., "Tuning the Crystal Structure and Magnetic Properties of FePt Nanomagnets," Advanced Materials, vol. 19, Jun. 6, 2007, pp. 1703-1706.

Resta, "Ab initio study of tetragonal variants in Ni2MnGa alloy," Journal of Physics: Condensed Matter, vol. 14, No. 20, May 27, 2002, 14 pp.

Rong et al., "Fabrication of Bulk Nanocomposite Magnets Via Severe Plastic Deformation and Warm Compaction," Applied Physics Letters, vol. 96, No. 10, Mar. 8, 2010, 3 pp.

Roy et al., "Depth Profile of Uncompensated Spins in an Exchange Bias System," Physical Review Letters, vol. 95, Jul. 21, 2005, 4 pp.

Rui et al., "In-Cluster-Structured Exchange-Coupled Magnets with High Energy Densities," Applied Physics Letters, vol. 89, Sep. 19, 2006, 3 pp.

Sabiryanov et al., "Electronic Structure and Magnetic Properties of Hard/Soft Multilayers," Journal of Magnetism and Magnetic Materials, vol. 177-181, Pt. 2, Jan. 1998, pp. 989-990.

Sakuma, "Electronic and Magnetic Structure of Iron Nitride, Fe16N2 (invited)," Journal of Applied Physics, vol. 79, No. 8, Apr. 15, 1996, 8 pp.

Scherlis et al., "Simulation of Heme Using DFT + U: A Step Toward Accurate Spin-State Energetics," The Journal of Physical Chemistry, vol. 111, No. 25, Apr. 21, 2007, pp. 7384-7391.

Schrefl et al., "Exchange Hardening in Nano-Structured Two-Phase Permanent Magnets," Journal of Magnetism and Magnetic Materials, vol. 127, Jul. 12, 1993, pp. 273-277.

Shi et al., "Diamond-Like Carbon Films Prepared by Facing-Target Sputtering," Thin Solid Films, vols. 420-421, Dec. 2, 2002, pp. 172-175.

Shimba et al., "Preparation of Iron Nitride Fe16N2 Nanoparticles by Reduction of Iron Nitrate," J. Japan Inst. Metals, vol. 74, No. 3, 2010, 5 pp. (Applicant points out, in accordance with MPEP 609.04(a), that the year of publication, 2010, is sufficiently earlier than the effective U.S. filing date, Jun. 30, 2014, so that the particular month of publication is not in issue.).

Shimoda et al., "High-Energy Cast Pr—Fe—B Magnets," Journal of Applied Physics, vol. 64, No. 10, Nov. 15, 1988, pp. 5290-5292.

Shinno et al., "Effects of Film Thickness on Formation Processes of Fe16N2 in Nitrogen Ion-Implanted Fe Films," Surface and Coatings Technology vol. 103-104, May 1998, pp. 129-134.

Shokrollahi et al., "Soft Magnetic Composite Materials (SMCs)," Journal of Materials Processing Technology, vol. 189, Feb. 20, 2007, pp. 1-12.

Sit et al., "Realistic Quantitative Descriptions of Electron Transfer Reactions: Diabatic Free-Energy Surfaces from First-Principles Molecular Dynamics," Physical Review Letters, vol. 97, Jul. 11, 2006, 4 pp.

Skomski et al., "Giant Energy Product in Nanostructured Two-Phase Magnets," Physical Review B, vol. 48, No. 21, Dec. 1, 1993, pp. 15812-15816.

Slater, "Electronic Structure of Alloys," Journal of Applied Physics, vol. 8, No. 6, Jun. 1937, 8 pp.

Solovyev et al., "Corrected Atomic Limit in the Local-Density Approximation and the Electronic Structure of d Impurities in Rb," Physical Review B, vol. 50, No. 23, Dec. 15, 1994, pp. 16861-16871.

Sozinov et al., "Crystal Structures and Magnetic Anisotropy Properties of Ni—Mn—Ga Martensitic Phases With Giant Magnetic-Field-Induced Strain," IEEE Transactions on Magnetics, vol. 38, No. 5, Sep. 2002, pp. 2814-2816.

Speich et al., "Elastic Constants of Binary Iron-Base Alloys," Metallurgical Transactions, vol. 3, No. 8, Aug. 1972, pp. 2031-2037.

Stablein, "Chapter 7: Hard Ferrites and Plastoferrites," Handbook of Ferromagnetic Materials, vol. 3, 1982, 162 pp. (Applicant points out, in accordance with MPEP 609.04(a), that the year of publica-

(56) References Cited

OTHER PUBLICATIONS tion, 1982, is sufficiently earlier than the effective U.S. filing date, Jun. 30, 2014, so that the particular month of publication is not in issue.).
Stern et al., "Electronic and Structural Properties of Fe3Pd-Pt Ferromagnetic Shape Memory Alloys," Journal of Applied Physics, vol. 91, No. 10, May 15, 2002, pp. 7818-7820.
Strnat et al., "Bonded Rare Earth-Cobalt Permanent Magnets," Proceedings of the 12th Rare Earth Research Conference, vol. 1, Jul. 18-22, 1976, 11 pp.
Strnat et al., "Rare Earth-Cobalt Permanent Magnets," Journal of Magnetism and Magnetic Materials, vol. 100, Nos. 1-3, Nov. 1991, pp. 38-56.
Strnat, "Modem Permanent Magnets for Applications in Electro-Technology," Proceedings Of The IEEE, vol. 78, No. 6, Jun. 1990, pp. 923-946.
"Annual Energy Outlook 2015, with projects to 2040," U.S. Energy Information Administration, Apr. 2015, 154 pp.
"International Energy Outlook 2013," U.S. Energy Information Administration, Jul. 2013, 312 pp.
"Nanocrystalline soft magnetic material, FINEMET," Materials Magic, Hiatchi Metals, Apr. 2005, 12 pp.
"New Compound Opens Way to EV Magnet without Rare Earths," Nikkei.com Morning Edition, Mar. 4, 2011, 1 pp.
2014 Titans of Technology-Jian-Ping Wang, Minneapolis/St. Paul Business Journal, Sep. 19, 2014, 18 pp.
Abdellateef et al., "Magnetic Properties and Structure of the alfa-Fe16N2 Films," Journal of Magnetism and Magnetic Materials, vol. 256, Nos. 1-3, Jan. 11, 2003, pp. 214-220.
Al-Omari et al., "Magnetic Properties of Nanostructured CoSm/FeCo Films," Physical Review B, vol. 52, No. 5, Aug. 1, 1995, pp. 3441-3447.
Amato et al., "Exchange-Spring Behavior of Hard/Soft Magnetic Multilayers: Optimization Study of the Nanostructure," Physica B: Condensed Matter, vol. 275, Nos. 1-3, Jan. 2000, pp. 120-123.
Anisimov et al., "Band Theory and Mott Insulators: Hubbard U Instead of Stoner I," Physical Review B, vol. 44, No. 3, Jul. 15, 1991, pp. 943-954.
Anisimov et al., "Band-Structure Description of Mott Insulators (NiO, MnO, FeO, CoO)," Journal of Physics: Condensed Matter, vol. 2, Apr. 30, 1990, pp. 3973-3987.
Anisimov et al., "Density-Functional Calculation of Effective Coulomb Interactions in Metals," Physical Review B, vol. 43, No. 10, Apr. 1, 1991, pp. 7570-7574.
Anisimov et al., "First-Principles Calculations of the Electronic Structure and Spectra of Strongly Correlated Systems: the LDA+U Method," Journal of Physics: Condensed Matter, vol. 9, Jan. 27, 1997, pp. 767-808.
Atiq et al., "Preparation and the Influence of Co, Pt and Cr Additions on the Saturation Magnetization of alfa"-Fe16N2 Thin Films," Journal of Alloys and Compounds, vol. 479, Feb. 23, 2009, pp. 755-758.
Bae et al., "Cost Effective Parallel-Branch Spiral Inductor with Enhanced Quality Factor and Resonance Frequency," Electronics and Telecommunications Research Institute, 2007, pp. 87-90.
Bao et al., "Synthesis and Properties of alfa-Fe16N2 in Magnetic Particles," Journal of Applied Physics, vol. 75, No. 10, May 15, 1994, pp. 5870-5872.
Barman et al., "Structural and Electronic Properties of Ni2MnGa," Physical Review B, vol. 72, Nov. 8, 2005, 7 pp.
Becke, "Density-Functional Exchange-Energy Approximation With Correct Asymptotic Behavior," Physical Review A General Physics, vol. 38, No. 6, Sep. 15, 1988, 4 pp.
Bland et al., "Ferromagnetic Moments in Metastable Magnetic Films by Spin-Polarized-Neutron Reflection," Physical Review Letters, vol. 58, No. 12, Mar. 23, 1987, pp. 1244-1247.
Bland et al., "Layer Selective Magnetometry in Ultrathin Magnetic Structures by Polarised Neutron Reflection," Journal of Magnetism and Magnetic Materials, vol. 165, Jun. 1997, pp. 46-51.

Blochl, "Projector Augmented-Wave Method," Physical Review B, vol. 50, No. 24, Dec. 15, 1994, pp. 17953-17979.
Blundell et al., "Polarised Neutron Reflection as a Probe of Magnetic Films and Multilayers," Physical Review B, vol. 46, No. 6, Aug. 1, 1992, pp. 3391-3400.
Bogaerts et al., "Monte Carlo simulation of an analytical glow discharge: motion of electrons, ions and fast neutrals in the cathode dark space," Spectrochimica Acta, vol. 50B, No. 1, Jan. 1995, 20 pp.
Borchers et al., "Observation of Antiparallel Magnetic Order in Weakly Coupled Co/Cu Multilayers," Physical Review Letters, vol. 82, No. 13, Mar. 29, 1999, pp. 2796-2799.
Borsa et al., "Phase Identification of Iron Nitrides and Iron Oxy-Nitrides with Mossbauer Spectroscopy," Hyperfine Interactions, vol. 151/152, Dec. 2003, pp. 31-48.
Bozorth, "Atomic Moments of Ferromagnetic Alloys," The Physical Review, vol. 79, No. 5, Sep. 1, 1950. pp. 887.
Brady et al., "Alloy Design of Intermetallics for Protective Scale Formation and for use as Precursors for Complex Ceramic Phase Surfaces," Intermetallics, vol. 12, Apr. 1, 2004, pp. 779-789.
Brady et al., "Pre-Oxidized and Nitrided Stainless Steel Alloy Foil for Proton Exchange Membrane Fuel Cell Bipolar Plates: Part 1. Corrosion, Interfacial Contact Resistance, and Surface Structure," Journal of Power Sources, vol. 195, Mar. 20, 2010, pp. 5610-5618.
Brady et al., "The Formation of Protective Nitride Surfaces for PEM Fuel Cell Metallic Bipolar Plates," Journal of the Minerals, Aug. 2006, pp. 50-57.
Brewer et al., "Epitaxial Fe16N2 Films Grown on Si(001) by Reactive Sputtering," Journal of Applied Physics, vol. 79, No. 8, Apr. 15, 1996, pp. 5321-5323.
Brewer et al., "Magnetic and Physical Microstructure of Fe16N2 Films Grown Epitaxially on Si(001)," Journal of Applied Physics, vol. 81, No. 8, Apr. 15, 1997, pp. 4128-4130.
Brown et al., "The Crystal Structure and Phase Transitions of the Magnetic Shape Memory Compound Ni2MnGa," Journal of Physics: Condensed Matter, vol. 14, No. 43, Oct. 18, 2002, pp. 10159-10171.
Bruno, "Tight-Binding Approach to the Orbital Magnetic Moment and Magnetocrystalline Anisotropy of Transition-Metal Monolayers," Physical Review B, vol. 39, No. 1, Jan. 1, 1989, pp. 865-868.
Buschbeck et al., "Full Tunability of Strain Along the fcc-bcc Bain Path in Epitaxial Films and Consequences for Magnetic Properties," Physical Review Letters, vol. 103, Nov. 20, 2009, 4 pp.
Campo et al., "Extended DFT + U + V Method With On-Site and Inter-Site Electronic Interactions," Journal of Physics: Condensed Matter, vol. 22, Jan. 19, 2010 (online), 12 pp.
Campos et al., "Evaluation of the Diffusion Coefficient of Nitrogen in Fe4N1-x Nitride Layers During Microwave Post-Discharge Nitriding," Applied Surface Science, vol. 249, Dec. 30, 2004, pp. 54-59.
Casoli et al., "Exchange-Coupled FePt/Fe Bilayers with Perpendicular Magnetization," IEEE Transactions on Magnetics, vol. 41, No. 10, Oct. 2005, pp. 3877-3879.
Ceperley et al., "Ground State of the Electron Gas by a Stochastic Method," Physical Review Letters, vol. 45, No. 7, Aug. 18, 1980, pp. 566-569.
Chakhalian et al., "Magnetism at the Interface Between Ferromagnetic and Superconducting Oxides," Nature Physics, vol. 2, Apr. 1, 2006, pp. 244-248.
Chakrabarti et al., "Influence of Ni Doping on the Electronic Structure of Ni2MnGa," Physical Review B vol. 72, Aug. 5, 2005, 4 pp.
Chen et al., "Modeling of On-Chip Differential Inductors and Transformers/Baluns," IEEE Transactions on Electron Devices, vol. 54, No. 2, Feb. 2007, pp. 369-371.
Cheng et al., "Tempering of Iron-Carbon-Nitrogen Martensites," Metallurgical Transactions A: Physical Metallurgy and Materials Science, vol. 23A, No. 4, Apr. 1992, pp. 1129-1145.
Chikazumi, "Physics of Ferromagnetism," Oxford Science Publications, Ed. 2, 1999, pp. 199-203. (Applicant points out, in accordance with MPEP 609.04(a), that the year of publication, 1999, is sufficiently earlier than the effective U.S. filing date, Jun. 30, 2014, so that the particular month of publication is not in issue.).

(56) References Cited

OTHER PUBLICATIONS

Cho, "The Best Refrigerator Magnet Ever?," Science/AAAD News, Science Now, Mar. 19, 2010, retrieved from the internet http://news.sciencemag.org/physics/2010/03/best-refrigerator-magnet-ever?sms_ ss=email, 2 pp.
Chu et al., "Opportunities and Challenges for a Sustainable Energy Future," Nature, vol. 488, No. 7411, Aug. 16, 2012, pp. 294-303.
Cococcioni et al., "Linear Response Approach to the Calculation of the Effective Interaction Parameters in the LDA+U Method," Physical Review B, vol. 71, Jan. 18, 2005, 16 pp.
Coey et al. "The magnetization of alpha-Fe16N2", Journal of Physics: Condensed Matter, 1994, Issue 6, L23-L28. (Year: 1994).
Coey et al., "Magnetic nitrides," Journal of Magnetism and Magnetic Materials, vol. 200, Mar. 10, 1999, pp. 405-420.
Coey, "Magic Moments in Magnetism," Physics World, vol. 6, No. 8, Aug. 1993, pp. 25-26.
Coey, "Permanent Magnet Applications" Journal of Magnetism and Magnetic Materials, vol. 248, Apr. 24, 2002, pp. 441-456.
Coey, "The Magnetization of Bulk alfa"-Fe16N2 (Invited)," Journal of Applied Physics, vol. 76, No. 19, Nov. 15, 1994, pp. 6632-6636.
Ji et al., "Growth and Depth-Dependence of Saturation Magnetization of Iron Nitride Thin Films on MgO Substrate," Spin, vol. 2, No. 1, Mar. 2012, 4 pp.
Ji et al., "N Site Ordering Effect on Partially Ordered Fe16N2," Applied Physics Letters, vol. 98, No. 9, Feb. 28, 2011, 3 pp.
Ji et al., "Perpendicular Magnetic Anisotropy and High Spin-Polarization Ratio in Epitaxial Fe—N Thin Films," Physical Review B, vol. 84, Dec. 14, 2011, 8 pp.
Ji et al., "Strain Induced Giant Magnetism in Epitaxial Fe16N2 Thin Film," Applied Physics Letters, vol. 102, Feb. 21, 2013, 4 pp.
Ji et al., "Theory of giant saturation magnetization in Alpha"-Fe16N2: Role of partial localization in ferromagnetism of 3d transition metals," New Journal of Physics, 12, 063032, Jun. 17, 2010, 9 pp.
Jiang et al., "9 T High Magnetic Field Annealing Effects on FeN Bulk Sample," Journal of Applied Physics, vol. 115, Mar. 13, 2014, 3 pp.
Jiang et al., "FeN Foils by Nitrogen lon-Implantation," Journal of Applied Physics, vol. 115, Mar. 12, 2014, 3 pp.
Jiang et al., "Improving Exchange-Spring Nanocomposite Permanent Magnets," Applied Physics Letters, vol. 85, No. 22, Nov. 29, 2004, pp. 5293-5295.
Jiang et al., "The Thermostability of the Fe16N2 Phase Deposited on a GaAs Substrate by Ion-Bean-Assisted Deposition," Journal of Physical Condensed Matter, vol. 6, Mar. 17, 1994, pp. L279-L282.
Jordan et al., "Magnetic Fluid Hyperthermia (MFH): Cancer Treatment with AC Magnetic Field Induced Excitation of Biocompatible Superparamagnetic Nanoparticles," Journal of Magnetism and Magnetic Materials vol. 201, Jul. 1, 1999 pp. 413-419.
Jugovic et al., "A Review of Recent Developments in the Synthesis Procedures of Lithium Iron Phosphate Powders," Journal of Power Sources, vol. 190, Feb. 6, 2009, pp. 538-544.
Kakeshit A et al., "Effect of Magnetic Fields on Athermal and Isothermal Martensitic Transformations in Fe—Ni—Mn Alloys," Materials Transactions, vol. 34, No. 5, Dec. 9, 1992, pp. 415-422.
Kaneko et al., "Fe—Cr—Co Ductile Magnet With (BH)max = 8 MGOe," AIP Conference Proceedings, 1976, 2 pp. (Applicant points out, in accordance with MPEP 609.04(a), that the year of publication, 1976, is sufficiently earlier than the effective U.S. filing date, Jun. 30, 2014, so that the particular month of publication is not in issue.).
Kardonina et al., "Transformations in the Fe—N System," Metal Science and Heat Treatment, vol. 52, Nos. 9-10, Oct. 2010, pp. 5-15.
Kart et al., "DFT Studies on Structure, Mechanics and Phase Behavior of Magnetic Shape Memory Alloys: Ni2MnGa," Physica Status Solidi, vol. 205, No. 5, Mar. 20, 1998, pp. 1026-1035.
Kikkawa et al., "Fine Fe16N2 powder prepared by low-temperature nitridation," Materials Research Bulletin, vol. 43, ScienceDirect, Feb. 19, 2008, 8 pp.
Kikkawa et al., "Particle Size Dependence in Low Temperature Nitridation Reaction for Fe16N2," Journal of Alloys and Compounds, vol. 449, Dec. 21, 2006 (online), pp. 7-10.
Kim et al., "New Magnetic Material Having Ultrahigh Magnetic Moment," Applied Physics Letters, vol. 20, No. 12, Jun. 15, 1972, pp. 492-494.
Kirby et al., "Anomalous ferromagnetism in TbMnO3 thin films," Journal of Applied Physics, vol. 105, No. 7, Apr. 2009, 3 pp.
Kita et al., "Magnetic Properties of Core-Shell Type Fe16N2 Nanoparticles," Journal of Magnetism and Magnetic Materials, vol. 310, Nov. 21, 2006, pp. 2411-2413.
Klemmer et al., "Magnetic Hardening and Coercivity Mechanisms in L1 Ordered FePd Ferromagnets," Scripta Metallurgica et Materialia, vol. 33, Nos. 10-11, Apr. 27, 1995, pp. 1793-1805.
Kneller et al., "The Exchange-Spring Magnet: A New Material Principle for Permanent Magnets," IEEE Transaction on Magnetics, vol. 27, No. 4, Jul. 1991, pp. 3588-3600.
Kohn et al., "Self-Consistent Equations Including Exchange and Correlation Effects," Physical Review, vol. 140, No. 4A, Nov. 15, 1965, pp. 1133-1138.
Komuro et al., "Epitaxial Growth and Magnetic Properties of Fe16N2 Films with High Saturation Magnetic Flux Density (Invited)," Journal of Applied Physics, vol. 67, No. 9, May 1, 1990, pp. 5126-5130.
Koyano et al., "Effect of Magnetic Field on Martensitic Transformation and Magnetization of Iron-Nitrides", Materials Transactions, JIM, vol. 41, No. 8, 2000, p. 923-927.
Koyano et al., "Magnetization of alfa' Iron Nitride Produced Through the fcc-bct Martensitic Transformation in High Magnetic Field," Journal of Applied Physics, vol. 100, No. 3, Aug. 1, 2006, 5 pp.
Kronmuller et al., "Micromagnetic Analysis of the Magnetic Hardening Mechanisms in RE—Fe—B Magnets," Journal De Physique, C8, No. 12, Tome 49, Dec. 1988, 6 pp.
Kulik et al., "Density Functional Theory in Transition-Metal Chemistry: A Self-Consistent Hubbard U Approach," Physical Review Letters, vol. 97, Sep. 8, 2006, 4 pp.
Lanska et al., "Composition and Temperature Dependence of the Crystal Structure of Ni—Mn—Ga Alloys," Journal of Applied Physics, vol. 95, No. 12, Jun. 15, 2004, pp. 8074-8078.
Lauter et al., "Highlights from the Magnetism Reflectometer at the SNS," Physica B, vol. 404, Sep. 1, 2009, pp. 2543-2546.
Lavernia et al., "The Raid Solidification Processing of Materials: Science, Principles, Technology, Advances, and Applications," Journal of Material Science, vol. 45, Dec. 1, 2009, pp. 287-325.
Lewis et al., "Perspectives on Permanent Magnetic Materials for Energy Conversion and Power Generation," Metallurgical and Materials Transactions A, vol. 44A, Jan. 2013, 19 pp.
Li et al., "Effect of Assistant rf Field on Phase Composition of Iron Nitride Film Prepared by Magnetron Sputtering Process," Journal of Vaccuum Science & Technology A, vol. 24, No. 1, Jan./Feb. 2006, pp. 170-173.
Liechtenstein et al., "Density-Functional Theory and Strong Interactions: Orbital Ordering in Mott-Hubbard Insulators," Physical Review B Condensed Matter, vol. 52, No. 8, Aug. 15, 1995, 5 pp.
Likhachev et al., "Modeling the Strain Response, Magneto-Mechanical Cycling Under the External Stress, Work Output and Energy Losses in Ni—Mn—Ga," Mechanics of Materials, vol. 38, May 2006 pp. 551-563.
Liu et al., "Discovery of localized states of Fe 3D electrons in Fe16N2 and Fe8N films: an evidence of the existence of giant saturation magnetization," arXiv:0909.4478, Sep. 2009, 13 pp.
Liu et al., "Effects of High Magnetic Fields on Solidification Microstructure of Al—Si Alloys," Journal of Material Science, vol. 46, Oct. 22, 2010, pp. 1628-1634.
Liu et al., "High Energy Products in Rapidly Annealed Nanoscale Fe/Pt Multilayers," Applied Physics Letters, vol. 72, No. 4, Jan. 26, 1998, pp. 483-485.
Liu et al., "Nanocomposite Exchange-Spring Magnet Synthesized by Gas Phase Method: From Isotropic to Anisotropic," Applied Physics Letters, vol. 98, Jun. 3, 2011, 3 pp.

(56) References Cited

OTHER PUBLICATIONS

Liu et al., "Nanocrystalline Soft Magnetic Ribbon with alfa"-Fe 16N2 Nanocrystallites Embedded in Amorphous Matrix," Journal of Magnetism and Magnetic Materials, vol. 320, Jun. 10, 2008, pp. 2752-2754.
Liu et al., "Nucleation Behavior of Bulk Ni—Cu Alloy and Pure Sb in High Magnetic Fields," Journal of Crystal Growth, vol. 321, Mar. 2, 2011, pp. 167-170.
Lorenz et al., "Precise Determination of the Bond Percolation Thresholds and Finite-Size Scaling Corrections for the sc, fcc, and bcc Lattices," Physical Review E, vol. 57, No. 1, Jan. 1998, pp. 230-236.
Ludtka et al., "In Situ Evidence of Enhanced Transformation Kinetics in a Medium Carbon Steel Due to a High Magnetic Field," Scripta Materialia, vol. 51, Apr. 20, 2004, pp. 171-174.
Maclaren, "Role of Alloying on the Shape Memory Effect in Ni2MnGa," Journal of Applied Physics, vol. 91, No. 10, May 15, 2002, pp. 7801-7803.
Majkrzak, "Polarized Neutron Reflectometry," Physica B: Condensed Matter, vol. 173, No. 1 & 2, Aug. 1991, 16 pp.
Mazin et al., "Insulating Gap in FeO: Correlations and Covalency," Physical Review B, vol. 55, No. 19, May 15, 1997, pp. 12822-12825.
Mccurrie, "Chapter 3: The Structure and Properties of Alinco Permanent Magnet Alloys," Handbook of Ferromagnetic Materials, vol. 3, 1982, 82 pp. (Applicant points out, in accordance with MPEP 609.04(a), that the year of publication, 1982, is sufficiently earlier than the effective U.S. filing date, Jun. 30, 2014, so that the particular month of publication is not in issue.).
Metzger et al., "Magnetism of alfa"-Fe16N2 (Invited)," Journal of Applied Physics, vol. 76, No. 10, Nov. 15, 1994, pp. 6626-6631.
Min, "Enhancement of Fe Magnetic Moments in Ferromagnetic Fe16B2, Fe16C2, And Fe16N2," International Journal of Modern Physics B. vol. 7, No. 1-3, Jan. 1993, pp. 729-732.
Morisako et al., "Magnetic Anisotropy and Soft Magnetism of Iron Nitride Thin Films Prepared by Facing-Target Sputtering," Journal of Applied Physics, vol. 69, No. 8, Apr. 15, 1991, pp. 5619-5621.
Cook, "Strain Induced Martensite Formation in Stainless Steel," Metallurgical Transactions A, vol. 18A, No. 2, Feb. 1987, pp. 201-210.
Croat, "Current Status of Rapidly Solidified Nd—Fe—B Permanent Magnets," IEEE Transactions on Magnetics, vol. 25, No. 5, Sep. 1989, pp. 3550-3554.
Cui et al., "Phase Transformation and Magnetic Anisotropy of an Iron-Palladium Ferromagnetic Shape-Memory Alloy," Acta Materialia, vol. 52, No. 1, Jan. 5, 2004, 35-47.
Davies et al., "Anisotropy Dependence of Irreversible Switching in Fe/SmCo and FeNi/FePt Exchange Spring Magnet Films," Applied Physics Letters, vol. 86, Jun. 27, 2005, 3 pp.
Davison et al., "Shock Compression of Solids," Physics Reports, vol. 55, No. 4, Apr. 1979, pp. 255-379.
Dong et al., "Shape Memory and Ferromagnetic Shape Memory Effects in Single-Crystal Ni2MnGa Thin Films," Journal of Applied Physics, vol. 95, No. 5, Mar. 1, 2004, pp. 2593-2600.
Du, "A Reevaluation of the Fe—N and Fe—C—N Systems," Journal of Phase Equilibria, vol. 14, No. 6, Aug. 24, 1993, pp. 682-693.
Dudarev et al., "Electron-Energy-Loss Spectra and the Structural Stability of Nickel Oxide: An LSDA+U Study," Physical Review B, vol. 57, No. 3, Jan. 15, 1998, pp. 1505-1509.
Entel et al., "Ab Initio Modeling ofMartensitic Transformation (MT) in Magnetic Shape Memory Alloys," Journal of Magnetism and Magnetic Materials, vol. 310, Nov. 27, 2006, pp. 2761-2763.
Fan et al., "Ferromagnetism at the Interfaces of Antiferromagnetic FeRh Epilayers," Physical Review B, vol. 82, Nov. 12, 2010, 5 pp.
Felcher, "Magnetic Depth Profiling Studies by Polarized Neutron Reflection," Physica B, vol. 192, Nos. 1 & 2, Jan. 1993, pp. 137-149.
Felcher, "Neutron Reflection as a Probe of Surface Magnetism," Physical Review B, vol. 24, No. 3, Aug. 1, 1981. pp. 1595-1598.

Ferguson et al., "The Tempering of Fe—C—N Martensite" Scripta Metallurgica, vol. 18, No. 11, Nov. 1984, pp. 1189-1194.
Fernando et al., "Magnetic Moment of Iron in Metallic Environments," Physical Review B, vol. 61, No. 1, Jan. 1, 2000, pp. 375-381.
Fidler et al., "Recent Developments in Hard Magnetic Bulk Materials," Journal of Physics: Condensed Matter, vol. 16, Jan. 23, 2004, pp. 455-470.
Floris et al., "Vibrational Properties of MnO and NiO from DFT + U-Based Density Functional Perturbation Theory," Physical Review B Condensed Matter, vol. 84, Oct. 13, 2011, 6 pp.
Frisk, "A New Assessment of the Fe—N Phase Diagram" Calphad, vol. 11, No. 2, 1987, pp. 127-134. (Applicant points out, in accordance with MPEP 609.04(a), that the year of publication, 1987, is sufficiently earlier than the effective U.S. filing date, Jun. 30, 2014, so that the particular month of publication is not in issue.).
Fullerton et al., "Structure and Magnetic Properties of Exchange-Spring Sm—Co/Co Superlattices," Applied Physics Letters vol. 72, No. 3, Jan. 19, 1998, pp. 380-382.
Gagnoud et al., "Electromagnetic Modelling of Induction Melting Devices in Cold Crucible," IEEE Transactions on Magnetics, vol. 24, No. 1, Jan. 1988, 5 pp.
Galanakis et al., "Spin-Polarization and Electronic Properties of Half-Metallic Heusler Alloys Calculated from First Principles," Journal of Physics: Condensed Matter, vol. 19, No. 31, Aug. 8, 2007, 16 pp.
Gao et al., "Exchange-coupling interaction and effective anisotropy in nanocomposite permanent materials," Chinese Science Bulletin, vol. 47, No. 14, Jul. 2002, pp. 1166-1169.
Gao et al., "Quantitative Correlation of Phase Structure With the Magnetic Moment in rf Sputtered Fe—N Films," Journal of Applied Physics, vol. 73, No. 10, May 15, 1993, pp. 6579-6581.
Gaunt, "The Magnetic Properties of Platinum Cobalt Near the Equiatomic Composition Part II. Mechanism of Magnetic Hardening," The Philosophical Magazine, vol. 13, No. 123, Mar. 1966, pp. 579-588.
Giannozzi et al., "Quantum Espresso: A Modular and Open-Source Software Project for Quantum Simulations of Materials," Journal of Physics: Condensed Matter, vol. 21, Sep. 1, 2009, pp. 1-19.
Godlevsky et al., "Soft Tetragonal Distortions in Ferromagnetic Ni2MnGa and Related Materials from First Principles," Physical Review B, vol. 63, Mar. 2, 2001, 5 pp.
Gong et al., "Mechanically Alloyed Nanocomposite Magnets," Journal of Applied Physics, vol. 75, No. 10, May 15, 1994, pp. 6649-6651.
Grimsditch et al., Exchange-Spring Systems: Coupling of Hard and Soft Ferromagnets as Measured by Magnetization and Brillouin Light Scattering (invited), Journal of Applied Physics., vol. 85, Apr. 15, 1999, pp. 5901-5904.
Guo et al., "A Broadband and Scalable Model for On-Chip Inductors Incorporating Substrate and Conductor Loss Effects," IEEE Radio Frequency Integrated Circuits Symposium, Jun. 12-14, 2005, pp. 593-596.
Gutfleisch et al., "Magnetic Materials and Devices for the 21st Century: Stronger, Lighter, and More Energy Efficient," Advanced Materials, vol. 23, 2011, Dec. 15, 2010, pp. 821-842.
Haenl et al., "Room-Temperature Ferroelectricity in Strain SrTiO3," Nature, vol. 430, Aug. 12, 2004, pp. 758-761.
Herbst et al., "Neodymium-Iron-Boron Permanent Magnets," Journal of Magnetism and Magnetic Materials, vol. 100, Nos. 1-3, Nov. 1991, pp. 57-78.
Herzer, "Grain Size Dependence of Coercivity and Permeability in Nanocrystalline Ferromagnets," IEEE Transactions on Magnetics, vol. 26, No. 5, Sep. 1990, pp. 1397-1402.
Himmetoglu, et al., "First-Principles Study of Electronic and Structural Properties of CuO," Physical Review B. vol. 84, Sep. 14, 2011, 8 pp.
Hohenberg et al., "Inhomogeneous Electron Gas," Physical Review, vol. 136, No. 3B, Nov. 9, 1964, pp. 864-871.
Hook et al., "Magnetic Order," Solid State Physics, Ed. 2, Ch. 8, 1991, pp. 219-252. (Applicant points out, in accordance with MPEP 609.04(a), that the year of publication, 1991, is sufficiently earlier

(56) References Cited

OTHER PUBLICATIONS than the effective U.S. filing date, Jun. 30, 2014, so that the particular month of publication is not in issue.).
Hoppler et al., "Giant Superconductivity-Induced Modulation of the Ferromagnetic Magnetization in a Cuprate-Manganite Superlattice," Nature Materials, vol. 8, Apr. 2009, pp. 315-319.
Hou et al., "SmCo5/Fe Nanocomposites Synthesized from Reductive Annealing of Oxide Nanoparticles," Applied Physics Letters, vol. 91, Oct. 12, 2007, 3 pp.
Hsu et al., "First-Principles Study for Low-Spin LaCoO3 with a Structurally Consistent Hubbard U," Physical Review B, vol. 79, Mar. 31, 2009, 9 pp.
Hsu et al., "Spin-State Crossover and Hyperfine Interactions of Ferric Iron in MgSiO3 Perovskite," Physical Review Letters, vol. 106, Mar. 18, 2011, 4 pp.
Huang et al., "Magnetism of alfa-FeN Alloys and alfa-(Fe16N2) Fe Nitrides," Journal of Magnetism and Magnetic Materials, vol. 135, Nov. 30, 1993, pp. 226-230.
Huang et al., "Spin-Density Distribution in Ferromagnetic alfa-Fe16N2," Physical Review B: Condensed Matter, vol. 51, No. 5, Feb. 1, 1995, pp. 3222-3225.
Huang et al., "Synthesis and characterization of Fe16N2 in bulk form," Journal of Applied Physics, vol. 75, No. 10, May 15, 1994, 3 pp.
Inoue et al., "Enhancement of the Formation of Fe15N2 on Fe Films by Co Additions (Invited)," Journal of Applied Physics, vol. 76, No. 10, Nov. 15, 1994, pp. 6653-6655.
Issakov et al., "Fast Analytical Parameters Fitting of Planar Spiral Inductors," 2008 IEEE International Conference on Microwaves, Communications, Antennas and Electronic Systems, May 13-14, 2008, 10 pp.
Jack, "The Iron-Nitrogen System: The Preparation and the Crystal Structures of Nitrogen-Austenite (Gama) and Nitrogen-Martensite (alfa')," Proceedings of the Royal Society of London, Mar. 13, 1951, pp. 200-217.
Jack, "The Occurrence and the Crystal Structure of alfa"-Iron Nitride; A New Type of Interstitial Alloy Formed During the Tempering of Nitrogen-Martensite," Proceedings of the Royal Society of London, vol. 208, Sep. 24, 1951, pp. 216-224.
Jan et al., "Monte Carlo Simulations of Spin-1/2 Micelle and Microemulsion Models," Journal De Physique, vol. 49, No. 4, Apr. 1988, pp. 623-633.
Ji et al., "Direct Observation of Giant Saturation Magnetization in Fe16N2," arXiv: 1211.0553, Nov. 2012, 27 pp.
Ji et al., "Elemental Specific Study on FeCo-Au nanoparticles," Bulletin of the American Physical Society, APS Meeting 2010, vol. 55, No. 2, Mar. 15-19, 2010, 1 pp.
Ji et al., "Epitaxial High Saturation Magnetization FeN Thin Films on Fe(001) Seeded GaAs(001) Single Crystal Wafer Using Facing Target Sputterings," Journal of Applied Physics, vol. 109, No. 7, Apr. 2011, 6 pp.
Yamamoto et al., "Formation of Fe16N2 in Deformed Iron by Ion Implantation Method," Proceedings of 1998 International Conference on Ion Implantation Technology, Jun. 22-26, 1998, 4 pp.
Yamanaka et al., "Humidity Effects in Fe16N2 Fine Powder Preparation by Low-Temperature Nitridation," Journal of Solid State Chemistry, vol. 183, Aug. 4, 2010, pp. 2236-2241.
Yang et al., "The Effect of Strain Induced by Ag Underlayer on Saturation Magnetization of Partially Ordered Fe16N2 Thin Films," Applied Physics Letters, vol. 103, Dec. 12, 2013, 4 pp.
Yao et al., "Formation and Magnetic Properties of Fe16N2 Films Prepared by Ion-Beam-Assisted Deposition," Journal of Magnetism and Magnetic Materials, vol. 177-181, Jan. 1998, pp. 1291-1292.
Zayak et al., "First-principles investigations of homogenous lattice-distortive strain and shuffles in Ni2MnGA," Journal of Physics: Condensed Matter, vol. 15, No. 2, Jan. 22, 2003, 8 pp.
Zayak et al., "Switchable Ni—Mn—Ga Heusler nanocrystals," Journal of Applied Physics vol. 104, No. 7, Oct. 2008, 6 pp.
Zeng et al., "Exchange-Coupled Nanocomposite Magnets by Nanoparticle Self-Assembly," International Weekly Journal of Science: Nature, vol. 420, No. 6914, Nov. 28, 2002, pp. 395-398.
Zhang et al., "Energy Barriers and Hysteresis in Martensitic Phase Transformations," Acta Materialia, vol. 57, Jul. 17, 2009, pp. 4332-4352.
Zhang et al., "Polarizer angular dependence of spin transfer oscillation in magnetic tunnel junction," Bulletin of the American Physical Society, APS Meeting 2010, vol. 55, No. 2, Mar. 15-19, 2010, 1 pp.
Zhang et al., "Shift of the Eutectoid Point in the Fe—C Binary System by a High Magnetic Field," Journal of Physics D: Applied Physics, vol. 40, Oct. 19, 2007, pp. 6501-6506.
Zhang et al., "Strain Effect of Multilayer FeN Structure on GaAs Substrate," Journal of Applied Physics, vol. 113, No. 17, Apr. 10, 2013, 3 pp.
Zhang et al., "Thermal Stability of Partially Ordered Fe16N2 Film on Non-Magnetic Ag Under Layer," Journal of Applied Physics, vol. 115, No. 17A, Mar. 20, 2014, 3 pp.
Zheng et al., "Iron Nitride Thin Films Deposited by Chloride Assisted Plasma Enhanced Chemical Vapour Deposition: Facile Stoichiometry Control and Mechanism Study," Journal of Applied Physics D: Applied Physics, vol. 42, No. 18, Sep. 21, 2009, 9 pp.
Zhou et al., "Configurational Electronic Entropy and the Phase Diagram of Mixed-Valence Oxides: The Case of LixFePO4," Physical Review Letters, vol. 97, Oct. 13, 2006, 4 pp.
Zhou et al., "First-Principles Prediction of Redox Potentials in Transition-Metal Compounds with LDA+U," Physical Review B. vol. 70, Dec. 20, 2004, 8 pp.
Zhou et al., "Permanent-Magnet Properties of Thermally Processed FePt and FePt—Fe Multilayer Films," IEEE Transactions on Magnetics, vol. 38, No. 5, Sep. 2002, pp. 2802-2804.
Zhou et al., "Phase Separation in LixFePO4 Induced by Correlation Effects," Physical Review B, vol. 69, May 12, 2004, 4 pp.
Zhou et al., "The Li Intercalation Potential of LIMPO4 and LiMSiO4 Olivines with M=Fe, Mn, Co, Ni," Electrochemistry Communications, vol. 6, Sep. 25, 2004, pp. 1144-1148.
Zhuge et al., "Preparation and Property of Iron Nitrides by Ball Mill Method," Journal of Functional Materials, vol. 31, No. 5, 2000, pp. 471-472 (Abstract Only (on last page)) (Applicant points out, in accordance with MPEP 609.04(a), that the year of publication, 2000, is sufficiently earlier than the effective U.S. filing date, Jun. 30, 2014, so that the particular month of publication is not in issue.).
Ziegler, "SRIM—The Stopping and Range of Ions in Matter," retrieved from http://srim.org/ on Oct. 13, 2016, 4 pp.

\* cited by examiner

APPLIED MAGNETIC FIELD SYNTHESIS AND PROCESSING OF IRON NITRIDE MAGNETIC MATERIALS

RELATED APPLICATIONS

This application is a continuation of U.S. patent application Ser. No. 15/840,747, filed Dec. 13, 2017, which is a continuation of U.S. patent application Ser. No. 14/754,284, filed Jun. 29, 2015, which claims the benefit of U.S. Provisional Patent Application No. 62/019,046, filed Jun. 30, 2014, each of which is incorporated herein by reference in its entirety.

GOVERNMENT INTEREST

This invention was made with Government support under contract number DE-AR0000199 awarded by DOE, Office of ARPA-E. The government has certain rights in this invention.

This invention was made with government support under ARPA-E 0472-1595 awarded by the Dept. of Energy. The government has certain rights in the invention.

TECHNICAL FIELD

The disclosure relates to techniques for forming iron nitride magnetic materials.

BACKGROUND

Permanent magnets can provide high efficiency and reliability for renewable energy technologies, including electrical vehicles and wind turbines, etc. Because rare earth permanent magnets have supply constraints and high price, a new magnet with more abundant and less strategically important elements is desired to replace rare earth magnets.

SUMMARY

The $\alpha''$-$Fe_{16}N_2$ phase is a promising candidate for rare-earth-free magnets. In this disclosure, techniques including annealing iron nitride materials in the presence of an applied magnetic field have been used to enhance the $Fe_{16}N_2$ phase formation in iron nitride materials. Increased volume fractions of the $Fe_{16}N_2$ phase may improve the magnetic properties of the iron nitride magnetic materials. Improved magnetic properties may include, for example, coercivity, magnetization, and magnetic orientation. In some examples, the applied magnetic field may be at least 0.2 Tesla (T). The temperature at which the magnetic field annealing is performed may at least partially depend upon further elemental additions to the iron nitride base composition and the approach used to initially synthesize the iron nitride base composition. In some examples, the magnetic field may be at least about 0.2 T, at least about 2 T, at least about 2.5 T, at least about 6 T, at least about 7 T, at least about 8 T, at least about 9 T, at least about 10 T, or higher. In some examples, the magnetic field is between about 5 T and about 10 T. In other examples, the magnetic field is between about 8 T and about 10 T.

In one example, the disclosure describes a method including annealing a material including iron and nitrogen in the presence of an applied magnetic field to form at least one $Fe_{16}N_2$ phase domain, wherein the applied magnetic field has a strength of at least about 0.2 Tesla (T).

In another example, the disclosure describes an apparatus configured to perform any of the techniques described herein.

In another example, the disclosure describes a material formed by any of the techniques described herein.

In an additional example, the disclosure describes a bulk permanent magnet formed by any of the techniques described herein.

The details of one or more examples are set forth in the accompanying drawings and the description below. Other features, objects, and advantages will be apparent from the description and drawings, and from the claims.

DETAILED DESCRIPTION

Figure 1:
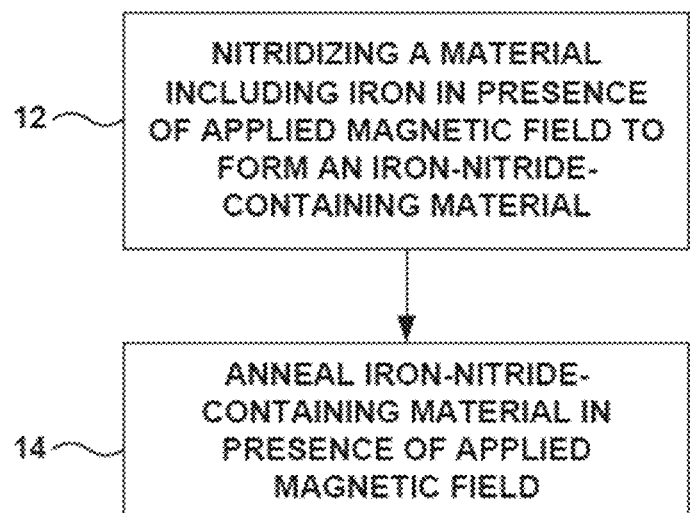
FIG. 1 is a flow diagram illustrating another example technique for forming an iron nitride permanent magnet.

The present disclosure describes the synthesis and processing of Fe—N magnetic materials under application of magnetic fields for facilitating the transformation of $Fe_8N$ phase to $Fe_{16}N_2$ phase, thus potentially increasing the volume ratio of $Fe_{16}N_2$ and improving magnetic properties of the magnetic material, including, for example, at least one of saturation magnetization, coercivity, remnant magnetization, or the like. The disclosure describes techniques including annealing a material including iron and nitrogen in the presence of a magnetic field greater than about 0.2 T. The presence of the magnetic field may facilitate transformation of iron nitride disordered phases into $Fe_{16}N_2$ phase. In some examples, the strength of the high magnetic field may be at least about 0.2 T, at least about 2 T, at least about 2.5 T, at least about 6 T, at least about 7 T, at least about 8 T, at least about 9 T, at least about 10 T, or higher. In some examples, the magnetic field is between about 0.2 T and about 10 T, or between about 2 and about 10 T, or between about 2.5 T and about 9 T, or between about 5 T and about 10 T, or between about 8 T and about 10 T.

In some examples, the material including iron and nitrogen may be annealed at a temperature between about 100° C. and about 250° C., such as between about 120° C. and about 250° C., for between about 10 hours to about 100 hours, while being exposed to the magnetic field. For example, the material including iron and nitrogen may be annealed at a temperature between about 120° C. and 200° C. for between about 10 hours to about 100 hours, while being exposed to the magnetic field. The atmosphere in which the material may be annealed may include, for example, vacuum, air, or liquid, such as oil. According to this disclosure, the material including iron and nitrogen may be annealed at a temperature of between about 150° C. and 160° C. for about 20 hours, while being exposed to the magnetic field. In other examples, for instance when the material including iron and nitrogen further includes at least one dopant, the material may be annealed at a temperature as high as about 250° C. for between about 10 hours and 100 hours, while being exposed to the magnetic field. The disclosure also describes an apparatus configured to perform the techniques disclosed herein, and materials that may be formed by the techniques described in this disclosure.

Annealing a material including iron and nitrogen in the presence of an applied magnetic field may facilitate the phase transformation for iron nitride magnetic materials, including iron nitride bulk samples, thin film samples, and nanoparticle (powder) samples. In some examples, the iron nitride magnetic materials additionally may include at least one dopant. For example, the dopant may include at least one metal dopant (e.g. Al, Mn, Ti, La, Co, Cr, Ni, rare earth metals, and combinations thereof), and/or at least one non-metal dopant (e.g., B, C, O, P, Si, and combinations thereof). The dopant may be incorporated in the iron nitride material or may be coated on the iron nitride material. In some examples, the temperature at which the material is annealed may vary based on the identity of one or more dopants in the material.

In some examples, radio waves generated by a radio frequency source (for example, radio waves having a power of between about 100 watts (W) and about 1000 W and a frequency between about 13.56 megahertz (MHz) and about 1.8 gigahertz (GHz) may be applied to assist annealing of the material including iron and nitrogen in the presence of a magnetic field, to facilitate formation of $Fe_{16}N_2$ phase in the material.

Additionally or alternatively, in some examples, an ultrasonic wave (for example, ultrasonic waves having a power of between about 50 W and 1000 W) may be applied to assist annealing of the material including iron and nitrogen in the presence of a magnetic field, to facilitate formation of $Fe_{16}N_2$ phase in the material.

In some examples, in addition to annealing the material including iron and nitrogen in the presence of an applied magnetic field, the techniques described herein may include solutionizing a material including iron and nitrogen in the presence of an applied magnetic field. During solutionizing, the material including iron and nitrogen may be brought to a temperature above the upper critical temperature to form a solution. For example, bulk FeN pellet materials, such as gamma-phase Fe—N(austenite), may be solutionized in an applied magnetic field at a high temperature, for example, at about 750° C. for about 15 minutes. Applying a magnetic field during solutionizing may shift the Fe—N phase equilibria, which may facilitate $Fe_{16}N_2$ phase formation during subsequent annealing. In some examples, after solutionizing, the material may be quenched, which may be accomplished inside or outside of the applied magnetic field. In some examples, the quenching may include multiple steps, such as quenching in water followed by placing the iron nitride materials at liquid nitrogen temperature for about 20 hours (h) to aid in conversion of any retained austenite Fe phase to $Fe_8N$ martensite. After quenching, the iron nitride material may be annealed in the presence of the applied magnetic field.

The crystalline texture of the iron nitride material relative to the direction of the applied magnetic field also may affect the conversion of iron nitride to $Fe_{16}N_2$ phase during annealing of the iron nitride materials in the presence of an applied magnetic field. By annealing a specific crystalline texture in a predetermined orientation relative to the direction of the applied magnetic field, external magnetic force (Zeeman energy) can facilitate the phase transformation from body-centered cubic (bcc) to body-centered tetragonal (bct).

An example technique of this disclosure includes nitridizing a material including iron in the presence of an applied magnetic field to form an iron-nitride-containing material (12), and annealing the iron-nitride-containing material in the presence of the applied magnetic field to form at least one $Fe_{16}N_2$ phase domain (14), as shown in FIG. 1. The applied magnetic field may be applied at different strengths, as described above. For example, the applied magnetic field may have a strength of at least about 0.2 T, at least about 2 T, at least about 2.5 T, at least about 6 T, at least about 7 T, at least about 8 T, at least about 9 T, at least about 10 T, or higher. In some examples, the applied magnetic field may have a strength of between about 0.2 T and about 10 T, or between about 2 and about 10 T, or between about 2.5 T and about 9 T, or between about 5 T and about 10 T, or between about 8 T and about 10 T.

The magnetic field may be constant or a pulse field. The on/off ratio of pulse field may be between about 0.1% (percentage of pulse "on" duration divided by the inverse of the pulse frequency) up to about 90%. The frequency of pulse field may be between several Hz and several MHz.

In some examples, nitridizing of a material including iron (e.g., an iron-based powder or iron-based nanoscale powder) may be performed at a relatively low temperature, for example, between about 100° C. and 250° C. Example materials including iron include iron oxide, iron carbide, or iron-metal solid solutions. In some examples, the temperature of nitridization may depend on the addition of dopants to the material including iron to yield improved magnetic properties. Such dopants may include, for example, Al, Mn, Ti, La, Co, Cr, Ni, rare earth metals, or combinations thereof. In some examples, nitridizing (or nitriding) may be performed in $NH_3$ gas, $H_2$ gas, $N_2$ gas, or mixtures thereof. Fe8N may or may not form as an intermediate during the synthesis of $Fe_{16}N_2$ according to this technique.

In some examples, nitridizing the material and annealing the iron-nitride-containing material may occur together in situ, in the presence of the applied magnetic field, to form at least one $Fe_{16}N_2$ phase domain. In some examples, an example technique also may include, prior to nitridizing the material including iron, reducing the material, where reduction of the material occurs in situ in the presence of the applied magnetic field. Reduction of the material including iron may remove oxygen from the material including iron, such as by reaction of oxygen with at least one of Ca, Al, or Na. The reducing of material including iron also may include exposing the material to $NH_3$ gas, $H_2$ gas, $N_2$ gas, or mixtures thereof. For example, a carbon-coated iron powder may be reduced in hydrogen gas for about 1 hour at a temperature of between about 375° C. and about 425° C., such as about 390° C., prior to nitridizing the powder.

The annealing of iron-nitride-containing materials formed from nitridizing a material including iron (e.g., iron nanoscale powder), and the various conditions associated with annealing, may be similar to or the same as annealing in a high magnetic field described with respect to other examples described herein of annealing a material including iron and nitrogen. Likewise, techniques of annealing the iron-nitride-containing materials may also include treatment with radio waves, ultrasonic waves, and addition of various dopants to the materials as described herein. Phase transformations (e.g., transformation of an $\alpha'$-$Fe_8N$ phase in the iron-nitride-containing material to an $\alpha''$-$Fe_{16}N_2$ phase), anticipated yields of transformation, and the volume of certain iron-nitride phases in iron-nitride-containing material, also may be similar to or the same for iron-nitride containing materials formed by nitridization techniques, as with respect to other examples described herein, such as the processing of Fe—N rod samples. Moreover, interactions between the applied magnetic field and the crystalline matrix of iron-nitride-containing material of the described technique (e.g., such materials formed by nitridization of iron powder), also may be similar to or the same as those interactions disclosed regarding materials including iron and nitrogen, such as processed Fe—N rod samples.

The iron nitride materials formed by the techniques described herein may be used as magnetic materials in a variety of applications, including, for example, bulk permanent magnets. Bulk permanent magnets may include a minimum dimension of at least about 0.1 mm. In some examples, the iron nitride materials that are annealed in the presence of an applied magnetic field may be bulk materials (have a minimum dimension of at least about 0.1 mm). In other examples, iron nitride materials that are annealed in the presence of the applied magnetic field may not be bulk materials (may have a minimum dimension less than about 0.1 mm), and the iron nitride materials may be consolidated with other iron nitride materials to form bulk permanent magnets. Examples of techniques that may be used to consolidate iron nitride magnetic materials are described, for example, in International Patent Application Number PCT/US2012/051382, filed on Aug. 17, 2012, and titled "IRON NITRIDE PERMANENT MAGNET AND TECHNIQUE FOR FORMING IRON NITRIDE PERMANENT MAGNET," the entire content of which is incorporated herein by reference.

For example, iron nitride materials may be arranged such that the <001> axes of the respective iron nitride materials are substantially aligned. Aligning the <001> axes of the respective iron nitride materials may provide uniaxial magnetic anisotropy to a bulk magnetic material, such as a permanent magnet, formed by joining the iron nitride materials.

The multiple iron nitride materials may be compressed using, for example, cold compression or hot compression. In some examples, the temperature at which the compression is performed may be below about 300° C., as $Fe_{16}N_2$ may begin to degrade above about 300° C. The compression may be performed at a pressure and for a time sufficient to join the multiple iron nitride materials into a substantially unitary bulk magnetic material, such as a permanent magnet.

Any number of iron nitride materials may be pressed together to form a bulk magnetic material, such as a permanent magnet. In some examples, the bulk magnetic material has a size such that a minimum dimension is at least 0.1 mm. In some examples, the bulk magnetic material has a size in at least one dimension of at least 1 mm. In some examples, the bulk magnetic material has a size in at least one dimension of at least 1 cm.

Other examples of techniques that may be used to consolidate iron nitride magnetic materials are described in International Patent Application Number PCT/US2014/015104, filed on Feb. 6, 2014, and titled "IRON NITRIDE PERMANENT MAGNET AND TECHNIQUE FOR FORMING IRON NITRIDE PERMANENT MAGNET," the entire content of which is incorporated herein by reference. For example, iron nitride materials may be sintered to form a bulk magnetic material. In some examples, For example, a plurality of iron nitride materials (which include $Fe_{16}N_2$ phase domains) may be mixed or interleaved with a plurality of workpieces (e.g., sheets, particles, or the like) that include iron or nonmagnetic materials. The iron nitride materials may be arranged so the <001> axes of the respective iron nitride materials are substantially aligned. Aligning the <001> axes of the respective iron nitride materials may provide uniaxial magnetic anisotropy to the bulk magnetic material.

Then, the iron nitride materials (alone or with iron or nonmagnetic materials) may be pressed together and sintered. The sintering pressure, temperature and duration may be selected to mechanically join the iron nitride materials while maintaining the crystal structure of the iron nitride materials (e.g., as including the $Fe_{16}N_2$ phase domains). Thus, in some examples, the sintering step may be performed at a relatively low temperature. For example, the sintering temperature may be below about 250° C., such as between about 120° C. and about 250° C., between about 150° C. and about 250° C., between about 120° C. and about 200° C., between about 150° C. and about 200° C., or about 150° C. The sintering pressure may be between, for example, about 0.2 gigapascal (GPa) and about 10 GPa. The sintering time may be at least about 5 hours, such as at least about 20 hours, or between about 5 hours and about 100 hours, or between about 20 hours and about 100 hours, or about 40 hours. The sintering time, temperature, and pressure may be affected by the materials in iron nitride materials that include iron or nonmagnetic materials. The sintering may be performed in an ambient atmosphere, a nitrogen atmosphere, a vacuum, or another inert atmosphere.

Other examples of techniques that may be used to consolidate iron nitride magnetic materials are described in International Patent Application Number PCT/US2014/015104, filed on Feb. 6, 2014, and titled "IRON NITRIDE PERMANENT MAGNET AND TECHNIQUE FOR FORMING IRON NITRIDE PERMANENT MAGNET," the entire content of which is incorporated herein by reference. For example, tin (Sn) may be disposed on a surface of at least iron nitride material including at least one $Fe_{16}N_2$ phase domain, such as a first workpiece and a second workpiece. Crystallite and atomic migration may cause the Sn to agglomerate. The first workpiece and the second workpiece then may be pressed together and heated to form an iron-tin (Fe—Sn) alloy. The Fe—Sn alloy may be annealed at a temperature between about 150° C. and about 400° C. to join the first workpiece and the second workpiece. In some examples, the annealing temperature may be sufficiently low that magnetic properties of the first workpiece and the second workpiece (e.g., magnetization of the at least one $Fe_{16}N_2$ and proportion of $Fe_{16}N_2$ phase domains within the workpieces and) may be substantially unchanged. In some examples, rather than Sn being used to join the iron nitride materials including at least one $Fe_{16}N_2$ phase domain, Cu, Zn, or Ag may be used.

In some examples, <001> crystal axes of the respective iron nitride materials may be substantially aligned. Aligning the <001> crystal axes of the respective iron nitride materials may provide uniaxial magnetic anisotropy to the magnet formed from iron nitride materials.

As another example, a plurality of iron nitride materials including at least one $Fe_{16}N_2$ phase domain may be disposed adjacent to each other, with <001> crystal axes substantially aligned. This may provide uniaxial magnetic anisotropy to the magnet formed from the iron nitride materials. Ferromagnetic particles may disposed within a resin or other adhesive, such as natural or synthetic resins, including ion-exchange resins, such as those available under the trade designation Amberlite™, from The Dow Chemical Company, Midland, Michigan; epoxies, such as Bismaleimide-Triazine (BT)-Epoxy; a polyacrylonitrile; a polyester; a silicone; a prepolymer; a polyvinyl buryral; urea-formaldehyde, or the like. The filled resin or other adhesive may then be used to substantially fully encapsulate the plurality of iron nitride materials including at least one $Fe_{16}N_2$ phase domain. In some examples, the resin or other adhesive may be cured to bond the plurality of iron nitride materials to each other.

The ferromagnetic particles may be magnetically coupled to $Fe_{16}N_2$ hard magnetic material within the plurality of iron nitride materials via exchange spring coupling. Exchange spring coupling may effectively harden the magnetically soft ferromagnetic particles and provide magnetic properties for the bulk material similar to those of a bulk material consisting essentially of $Fe_{16}N_2$. To achieve exchange spring coupling throughout the volume of the magnetic material, the $Fe_{16}N_2$ domains may be distributed throughout the bulk magnetic material, e.g., at a nanometer or micrometer scale. In some examples, magnetic materials including $Fe_{16}N_2$ domains and domains of ferromagnetic particles and resin or other adhesive may include a volume fraction of $Fe_{16}N_2$ domains of less than about 40 volume percent (vol. %) of the entire bulk magnetic material. The ferromagnetic particles 144 may include, for example, Fe, FeCo, $Fe_8N$, or combinations thereof.

As another example, a compression shock apparatus may be used to generate a compression shock, which joins the iron nitride materials. Again, a plurality of iron nitride materials may be disposed adjacent to each other, with <001> crystal axes substantially aligned. At least some ferromagnetic particles may be disposed between adjacent iron nitride materials. In some examples, shock compression may include placing the iron nitride materials between parallel plates. The iron nitride materials may be cooled by flowing liquid nitrogen through conduit coupled to a back side of one or both of the parallel plates, e.g., to a temperature below 0 qC. A gas gun may be used to impact one of the parallel plates with a burst of gas at a high velocity, such as about 850 m/s. In some examples, the gas gun may have a diameter between about 40 mm and about 80 mm. After the shock compression, the ferromagnetic particles may be magnetically coupled to $Fe_{16}N_2$ hard magnetic material within the plurality of iron nitride materials via exchange spring coupling.

As another example, a conductive coil through which a current may be applied, which generates an electromagnetic field may be used to join iron nitride materials. The current may be generated in a pulse to generate an electromagnetic force, which may help to consolidate the iron nitride materials. In some examples, ferromagnetic particles may be disposed about the iron nitride materials. In some examples, the iron nitride materials may be disposed within an electrically conductive tube or container within the bore of a conductive coil. The conductive coil may be pulsed with a high electrical current to produce a magnetic field in the bore of the conductive coil that, in turn, induces electrical currents in the electrically conductive tube or container. The induced currents interact with the magnetic field generated by the conductive coil to produce an inwardly acting magnetic force that collapses the electrically conductive tube or container. The collapsing electromagnetic container or tube transmits a force to the iron nitride materials and joins the iron nitride materials. After the consolidation of the iron nitride materials with the ferromagnetic particles (if present), the ferromagnetic particles may be magnetically coupled to $Fe_{16}N_2$ hard magnetic material within the iron nitride materials via exchange spring coupling. In some examples, this technique may be used to produce workpieces that have at least one of cylindrical symmetry, a high aspect-ratio, or a net shape (a shape corresponding to a desired final shape of the workpiece).

In any of the above examples, other techniques for assisting consolidation of a plurality of workpieces including at least one $_{Fe16N2}$ phase domain may be used, such as pressure, electric pulse, spark, applied external magnetic fields, a radio frequency signal, laser heating, infrared heating, for the like. Each of these example techniques for joining a plurality of workpieces including at least one $Fe_{16}N_2$ phase domain may include relatively low temperatures such that the temperatures use may leave the $Fe_{16}N_2$ phase domains substantially unmodified (e.g., by converting $Fe_{16}N_2$ phase domains to other types of iron nitride).

In some examples, the disclosure describes techniques for forming a magnet including $Fe_{16}N_2$ phase domains from a powder including iron nitride. By using iron nitride-containing raw materials to form the permanent magnet including $Fe_{16}N_2$ phase domains, further nitriding of iron may be avoided, which may reduce a cost of forming the permanent magnet including $Fe_{16}N_2$ phase domains, e.g., compared to techniques which include nitriding pure iron.

Figure 2:
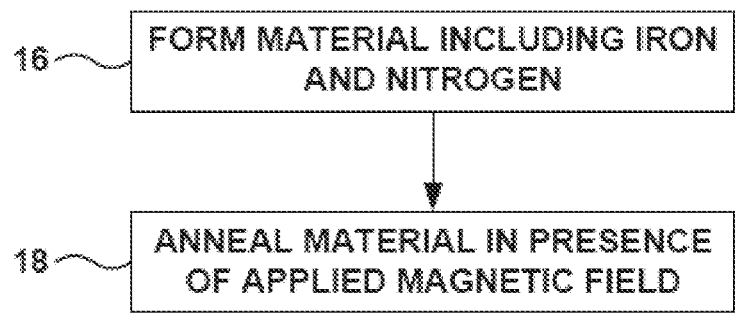
FIG. 2 is a flow diagram illustrating an example technique for forming an iron nitride permanent magnet.

In some examples, the disclosure describes a technique for forming an iron nitride permanent magnet. FIG. 2 is a flow diagram illustrating an example technique for forming an iron nitride permanent magnet. The technique of FIG. 2 includes forming a material including a mixture of iron and nitrogen (16). Examples of techniques that may be used to form materials including a mixture of iron and nitrogen are described, for example, in International Patent Application Number PCT/US2012/051382, filed on Aug. 17, 2012, and titled "IRON NITRIDE PERMANENT MAGNET AND TECHNIQUE FOR FORMING IRON NITRIDE PERMANENT MAGNET," the entire content of which is incorporated herein by reference. For example, an iron material may be strained along a direction substantially parallel (e.g., parallel or nearly parallel) to a <001> axis of at least one iron crystal in the iron material. The strain may be exerted on the iron material using a variety of strain inducing apparatuses. For example, a first end and a second end of iron material may received by (e.g., wound around) a first roller and a second roller, respectively, and the rollers may be rotated in opposite directions to exert a tensile force on the iron material. In other examples, opposite ends of the iron material may be gripped in mechanical grips, e.g., clamps, and the mechanical grips may be moved away from each other to exert a tensile force on the iron material. The iron material may be strained between about 0.3% and about 7%.

As the iron material is strained, the iron material may be nitridized. During nitridizing, the iron material may be heated and exposed to a nitrogen source. For example, the iron material may be heated to a temperature between about 125° C. and about 600° C. for between about 2 hours and about 9 hours. The nitrogen source may include, for example, diatomic nitrogen ($N_2$), ammonia ($NH_3$), or urea, and may be supplied in gas phase or liquid phase. Regardless of the technique used to nitridize the iron material, in some examples, the nitrogen may be diffused into the iron material to a concentration of between about 8 atomic percent (at. %) and about 14 at. %, such as about 11 at. %.

Other examples of techniques that may be used to form materials including a mixture of iron and nitrogen are described, for example, in International Patent Application Number PCT/US2014/015104, filed on Feb. 6, 2014, and titled "IRON NITRIDE PERMANENT MAGNET AND TECHNIQUE FOR FORMING IRON NITRIDE PERMANENT MAGNET," the entire content of which is incorporated herein by reference. For example, N+ ions may be implanted in an iron material using ion implantation. The iron material may include a plurality of iron crystals. In some examples, the plurality of iron crystals may have crystal axes oriented in substantially the same direction. For example, a major surface of the iron material may be parallel to the (110) surfaces of all or substantially all of the iron crystals. In other examples, a major surface of the iron material may be parallel to another surface of all or substantially all of the iron crystals. By using an iron material in which all or substantially all of the iron crystals have substantially aligned crystal axes, anisotropy formed when forming the $Fe_8N$ and $Fe_{16}N_2$ phases may be substantially aligned.

In some examples, the iron material includes a foil. The iron material may define a thickness on the order of hundreds of nanometers to millimeters. In some examples, the iron material may define a thickness between about 500 nanometers (nm) and about 1 millimeter (mm). The thickness of the iron material may affect the parameters used for ion implantation and annealing of the iron material.

Prior to implantation of N+ ions in the iron material, the iron material may be positioned on a surface of a silicon substrate or a gallium arsenide (GaAs) substrate. In some examples, the iron material may be position on the (111) surface of a (single crystal) silicon substrate, although any crystalline orientation may be used.

The average depth to which the N+ ions are implanted in the iron material may depend upon the energy to which the N+ ions are accelerated. The implant energy used to implant the N+ ions may be selected based at least in part on the thickness of the iron material. The implant energy also may be selected to implant the N+ ions without doing overly significant damage to the iron material, including the crystal lattice of the iron crystals in the iron material. For example, while higher implant energies may allow implantation of the N+ ions at a greater average depth, higher implant energies may increase the damage to the iron material, including damaging the crystal lattice of the iron crystals and ablating some of the iron atoms due to the impact of the N+ ions.

Additionally, the fluency of N+ ions may be selected to implant a desired dose of N+ ions within the iron material. In some examples, the fluency of N+ ions may be selected to implant approximately stoichiometric number of N+ ions within the iron material. The stoichiometric ratio of iron to nitrogen in $Fe_{16}N_2$ is 8:1. Thus, the approximate number of iron atoms in the iron material may be determined, and a number of N+ ions equal to approximately ⅛ (12.5%) of the iron atoms may be implanted in the iron material, such as between about 8 at. % and about 15 at. %. The temperature of the iron material during the ion implantation also may be controlled. In some examples, the temperature of the iron material may be between about room temperature and about 500 qC.

Other examples of techniques that may be used to form materials including a mixture of iron and nitrogen are described, for example, in International Patent Application No. PCT/US2014/043902, filed Jun. 24, 2014, and titled "IRON NITRIDE MATERIALS AND MAGNETS INCLUDING IRON NITRIDE MATERIALS," which claims the benefit of U.S. Provisional Patent Application No. 61/935,516, filed Feb. 4, 2014, and titled "IRON NITRIDE MATERIALS AND MAGNETS INCLUDING IRON NITRIDE MATERIALS." The entire contents of International Patent Application No. PCT/US2014/043902 and U.S. Provisional Patent Application No. 61/935,516 are incorporated herein by reference. For example, iron materials may be milled in the presence of a nitrogen source to form iron-nitride containing particles. The milling apparatus may include, for example, a rolling mode milling apparatus, a stirring mode milling apparatus, or a vibration mode milling apparatus. In some examples, the iron material may include substantially pure iron (e.g., iron with less than about 10 atomic percent (at. %) dopants or impurities). In some examples, the dopants or impurities may include oxygen or iron oxide. The iron material may be provided in any suitable form, including, for example, a powder or relatively small particles. In some examples, an average size of particles in the iron material may be less than about 100 micrometers (μm).

The nitrogen source may include ammonium nitrate ($NH_4NO_3$) or an amide-containing material, such as a liquid amide or a solution containing an amide, or hydrazine or a solution containing hydrazine. Amides include a C—N—H bond and hydrazine includes an N—N bond. Ammonium nitrate, amides and hydrazine may serve as a nitrogen donor for forming the powder including iron nitride. Example amides include carbamide (($NH_2)_2CO$; also referred to as urea), methanamide, benzamide, and acetamide, although any amide may be used.

In some examples, the milling apparatus may also contain a catalyst, such as Co, Ni, or both, which may catalyze the nitriding of the iron material. The bin of the milling apparatus may be rotated at a rate sufficient to cause mixing of the components in the bin (e.g., the milling spheres, the iron material, the nitrogen source, and, optionally, the catalyst) and cause the milling spheres to mill the iron material. In some examples, the bin may be rotated at a rotational speed of about 500 revolutions per minute (rpm) to about 2000 rpm, such as between about 600 rpm and about 650 rpm, about 600 rpm, or about 650 rpm. Milling may be performed for a predetermined time selected to allow nitriding of the iron material and milling of the iron material (and nitridized iron containing material) to a predetermined size distribution. In some examples, milling may be performed for a time between about 1 hour and about 100 hours, such as between about 1 hour and about 20 hours, or about 20 hours, or about 24 hours. In some examples, the milling apparatus may be stopped for about 10 minutes after each 10 hours of milling to allow the milling apparatus, the iron material, the nitrogen source, and, if present, the catalyst to cool.

As another example, a mixture of iron and nitrogen may be formed by melting a mixture including iron and nitrogen to form a molten iron nitride-containing mixture. The mixture including iron and nitrogen may include, for example, including an approximately 8:1 iron-to-nitrogen atomic ratio. For example, the mixture may include between about 8 atomic percent (at. %) and about 15 at. % nitrogen, with a balance iron, other elements, and dopants. As another example, the mixture may include between about 10 at. % and about 13 at. % nitrogen, or about 11.1 at. % nitrogen.

In some examples, the mixture including iron and nitrogen may include at least one type of iron nitride, such as, for example, FeN, $Fe_2N$ (e.g., $\xi$-$Fe_2N$), $Fe_3N$ (e.g., $\epsilon$-$Fe_3N$), $Fe_4N$ (e.g., $\gamma'$-$Fe_4N$ and/or $\gamma$-$Fe_4N$), $Fe_2N_6$, $Fe_8N$, $Fe_{16}N_2$, or $FeN_x$ (where x is between about 0.05 and about 0.5), in addition to iron and/or nitrogen. In some examples, the mixture including iron and nitrogen may have a purity (e.g., collective iron and nitrogen content) of at least 92 atomic percent (at. %).

In some examples, the iron and nitrogen may be melted by heating the mixture at a temperature above about 1500° C. In some examples, the mixture including iron and nitrogen may be heated in a furnace using a radio frequency (RF) induction coil. In examples in which a bulk iron nitride-containing material is used, the furnace may be heated at a temperature greater than about 1600° C. In examples in which an iron-nitride containing powder is used, the furnace may be heated at a temperature greater than about 2000° C.

Once the mixture including iron and nitrogen is molten, the mixture may be subjected to a casting, quenching, and pressing process to form iron nitride material. In some examples, the casting, quenching, and pressing process may be continuous, as opposed to a batch process. The molten mixture including iron and nitrogen may be deposited in a mold, which may shape the mixture including iron and nitrogen into a predetermined shape, such as at least one wire, ribbon, or other article having length that is greater than its width or diameter. During the casting process, the temperature of the mold may be maintained at a temperature between about 650° C. and about 1200° C., depending on the casting speed. The casting process can be conducted in air, a nitrogen environment, an inert environment, a partial vacuum, a full vacuum, or any combination thereof. The casting process can be at any pressure, for example, between about 0.1 GPa and about 20 GPa. In some examples, the casting process can be assisted by a straining field, a temperature field, a pressure field, a magnetic field, an electrical field, or any combination thereof.

After casting is complete or while the casting process is being completed, the mixture including iron and nitrogen may be quenched to set the crystalline structure and phase composition of the iron-nitride containing material. In some examples, during the quenching process, the workpieces may be heated to a temperature above 650° C. for between about 0.5 hour and about 20 hours. In some examples, the temperature of the workpieces may be dropped abruptly below the martensite temperature of the workpiece alloy (Ms). For example, for $Fe_{16}N_2$, the martensite temperature (Ms) is about 250° C. The medium used for quenching can include a liquid, such as water, brine (with a salt concentration between about 1% and about 30%), a non-aqueous liquid or solution such as an oil, or liquid nitrogen. In other examples, the quenching medium can include a gas, such as nitrogen gas with a flow rate between about 1 sccm and about 1000 sccm. In other examples, the quenching medium can include a solid, such as salt, sand, or the like. In some examples, the workpieces including iron and nitrogen may be cooled at a rate of greater than 50° C. per second during the quenching process. In some examples, the casting process can be assisted by a magnetic field and/or an electrical field.

After quenching is complete, the iron nitride material may be pressed to achieve the predetermined size of the iron nitride material. During the pressing process, the temperature of the iron nitride material may be maintained below about 250° C., and the iron nitride material may be exposed to a pressure between about 5 tons and 50 tons, depending on the desired final dimension (e.g., thickness or diameter) of the iron nitride material. When the pressing process is complete, the iron nitride material may be in the shape of a workpiece with a dimension in one or more axis between about 0.001 mm and about 50 mm (e.g., a diameter between about 0.1 mm and about 50 mm for a wire or a thickness between about 0.001 mm and about 5 mm for a ribbon). The iron nitride workpiece may include at least one $Fe_8N$ iron nitride phase domain.

Regardless of the technique by which the iron nitride material is formed, the technique of FIG. 2 also includes annealing the material including iron and nitrogen in the presence of an applied magnetic field (18). The applied magnetic field may be applied at different strengths, as described above. For example, the applied magnetic field may have a strength of at least about 0.2 T, at least about 2 T, at least about 2.5 T, at least about 6 T, at least about 7 T, at least about 8 T, at least about 9 T, at least about 10 T, or higher. In some examples, the applied magnetic field may have a strength of between about 0.2 T and about 10 T, or between about 2 and about 10 T, or between about 2.5 T and about 9 T, or between about 5 T and about 10 T, or between about 8 T and about 10 T. As an example, the material including iron and nitrogen may be annealed at a temperature of between about 100° C. and 200° C. for between about 10 hours to about 100 hours, while being exposed to the magnetic field. In some examples, the material including iron and nitrogen may be annealed at a temperature of about 150° C. and about 160° C. for between about 10 hours and about 30 hours, such as about 20 hours, while being exposed to the magnetic field. In other examples, for instance when the material including iron and nitrogen further includes at least one dopant, the material may be annealed at a temperature as high as about 250° C. for between about 10 hours and 100 hours, while being exposed to the magnetic field. The atmosphere in which material including iron and nitrogen, or iron-nitride containing materials, may be annealed may include, for example, vacuum, air, or liquid, such as oil.

Clause 1: A method comprising annealing a material including iron and nitrogen in the presence of an applied magnetic field to form at least one $Fe_{16}N_2$ phase domain, wherein the applied magnetic field has a strength of at least about 0.2 Tesla (T).

Clause 2: The method of clause 1, wherein the strength of the high magnetic field is greater than about 2.5 T.

Clause 3: The method of clause 1, wherein the strength of the high magnetic field is about 9 T.

Clause 4: The method of clause 1, wherein the strength of the high magnetic field is greater than about 9 T.

Clause 5: The method of any one of clauses 1 to 4, wherein annealing the material comprises heating the material at a temperature of between about 120° C. to about 200° C. for between about 10 hours and about 100 hours.

Clause 6: The method of any one of clauses 1 to 4, wherein annealing the material comprises heating the material at a temperature between about 150° and about 160° C. for about 20 hours.

Clause 7: The method of any one of clauses 1 to 6, further comprising exposing the material to a radio wave, wherein the radio wave has a power of between about 100 W and about 1000 W, and a frequency of between about 13.56 MHz and about 1.8 GHz.

Clause 8: The method of any one of clauses 1 to 6, further comprising exposing the material to an ultrasonic wave, wherein the ultrasonic wave has a power of between about 50 W and about 1000 W.

Clause 9: The method of any one of clauses 1 to 8, wherein the material comprises at least one of a pellet, rod, thin film, nanoparticle, powder, or nanoscale powder.

Clause 10: The method of any one of clauses 1 to 9, wherein the material further comprises at least one dopant.

Clause 11: The method of clause 10, wherein the at least one dopant comprises at least one of Al, Mn, La, Cr, Co, Ti, Ni, or a rare earth metal.

Clause 12: The method of clause 10 or 11, wherein the at least one dopant comprises at least one of B, C, P, Si, or O.

Clause 13: The method of any one of clauses 10 to 12, wherein annealing the material comprises heating the material at a temperature of between about 100° C. to about 250° C. for between about 10 hours and about 100 hours.

Clause 14: The method of any one of clauses 1 to 13, wherein annealing the material in the presence of the applied magnetic field transforms an $\alpha'$-$Fe_8N$ phase in the material to an $\alpha''$-$Fe_{16}N_2$ phase.

Clause 15: The method of clause 14, wherein a transformation yield of the $\alpha'$-$Fe_8N$ phase to the $\alpha''$-$Fe_{16}N_2$ phase is at least 70%.

Clause 16: The method of any one of clauses 1 to 15, wherein, after annealing, the $\alpha''$-$Fe_{16}N_2$ phase in the material is at least 20% of the material by volume.

Clause 17: The method of any one of clauses 1 to 16, wherein the applied magnetic field is applied in substantial alignment with a c axis of at least one iron crystal in the material.

Clause 18: The method of any one of clauses 1 to 17, wherein annealing the material reassembles a plurality of nitrogen atoms of the material from a disordered state to an ordered state within a crystalline matrix of the material.

Clause 19: The method of any one of clauses 1 to 18, wherein annealing the material in the presence of the applied magnetic field modifies a phase of iron nitride in the material and a crystalline orientation of the iron nitride.

Clause 20: The method of any of clauses 1 to 19, further comprising: prior to annealing the material, solutionizing the material in the presence of an applied magnetic field with a strength of at least about 0.2 T; and after solutionizing the material, quenching the material.

Clause 21: The method of clause 20, wherein quenching the material comprises exposing the material to liquid nitrogen for about 20 hours.

Clause 22: The method of clause 20 or 21, wherein solutionizing the material comprises solutionizing the material in the presence of an applied magnetic field with a strength of at least about 9 T magnetic field at about 750° C.

Clause 23: The method of any one of clauses 20 to 22, wherein quenching the material comprises quenching the material with water outside the presence of the magnetic field applied during solutionization.

Clause 24: The method of any one of clauses 20 to 22, wherein quenching the material with water comprises quenching the material with water within the presence of the magnetic field applied during solutionization.

Clause 25: The method of clause 20, wherein solutionizing the material comprises solutionizing the material at about 900° C.

Clause 26: The method of any one of clauses 1 to 25, wherein, prior to solutionizing, the concentration of nitrogen in the material is between about 8 atomic percent (at. %) and about 9 at. %.

Clause 27: A method comprising: nitridizing a material including iron in the presence of an applied magnetic field to form an iron-nitride-containing material; and annealing the iron-nitride-containing material in the presence of the applied magnetic field to form at least one $Fe_{16}N_2$ phase domain, wherein the applied magnetic field has a strength of at least about 0.2 Tesla (T).

Clause 28: The method of clause 27, wherein the material including iron comprises an iron-based powder or iron-based nanoscale powder.

Clause 29: The method of clause 27 or 28, wherein the material comprises at least one of an iron oxide, iron carbide, iron chloride, or iron-metal solid solution.

Clause 30: The method of any one of clauses 27 to 29, wherein nitridizing the material and annealing the iron-nitride-containing material to form at least one $Fe_{16}N_2$ phase domain occur in situ in the presence of the applied magnetic field.

Clause 31: The method of any of clauses 27 to 30, further comprising, prior to nitridizing the material, reducing the material, wherein reduction of the material occurs in situ in the presence of the applied magnetic field.

Clause 32: The method of clause 31, wherein reducing the material comprises reducing the material in at least one of hydrogen, nitrogen, or ammonia gas.

Clause 33: The method of clause 31, wherein reducing the material comprises reducing a carbon-coated iron powder in hydrogen gas for about 1 hour at a temperature of about 390° C.

Clause 34: The method of any one of clauses 27 to 33, wherein the strength of the high magnetic field is greater than about 2.5 T.

Clause 35: The method of any one of clauses 27 to 33, wherein the strength of the high magnetic field is about 9 T.

Clause 36: The method of any one of clauses 27 to 33, wherein the strength of the high magnetic field is greater than about 9 T.

Clause 37: The method of any one of clauses 27 to 36, wherein annealing the iron-nitride-containing material comprises heating the iron-nitride-containing material at a temperature of between about 100° C. to about 250° C. for between about 10 hours and about 100 hours.

Clause 38: The method of any one of clauses 27 to 36, wherein annealing the iron-nitride-containing material comprises heating the material at a temperature between about 150° and 160° C. for about 20 hours.

Clause 39: The method of any one of clauses 27 to 38, further comprising exposing the iron-nitride-containing material to a radio wave, wherein the radio wave has a power of between about 100 W and about 1000 W, and a frequency of between about 13.56 MHz and about 1.8 GHz.

Clause 40: The method of any one of clauses 27 to 38, further comprising exposing the iron-nitride-containing material to an ultrasonic wave, wherein the ultrasonic wave has a power of between about 50 W and about 1000 W.

Clause 41: The method of any one of clauses 27 to 40, wherein the iron-nitride-containing material further comprises at least one dopant.

Clause 42: The method of clause 41, wherein the at least one dopant comprises at least one of Al, Mn, La, Cr, Co, Ti, Ni, or a rare earth metal.

Clause 43: The method of clause 41 or 42, wherein the at least one dopant comprises at least one of B, C, P, Si, or O.

Clause 44: The method of any one of clauses 27 to 43, wherein annealing the iron-nitride-containing material in the presence of the applied magnetic field transforms an $\alpha'$-$Fe_8N$ phase in the iron-nitride-containing material to an $\alpha''$-$Fe_{16}N_2$ phase.

Clause 45: The method of clause 44, wherein a transformation yield of the $\alpha'$-$Fe_8N$ phase to the $\alpha''$-$Fe_{16}N_2$ phase is at least 70%.

Clause 46: The method of any one of clauses 27 to 45, wherein, after annealing, the $\alpha''$-$Fe_{16}N_2$ phase in the iron-nitride-containing material is at least 20% of the iron-nitride-containing material by volume.

Clause 47: The method of any one of clauses 27 to 46, wherein the applied magnetic field is applied in substantial alignment with a c axis of at least one iron crystal in the iron-nitride-containing material.

Clause 48: The method of any one of clauses 27 to 47, wherein annealing the iron-nitride-containing material reassembles a plurality of nitrogen atoms of the iron-nitride-containing material from a disordered state to an ordered state within a crystalline matrix of the iron-nitride-containing material.

Clause 49: The method of any of clauses 27 to 48, wherein annealing the iron-nitride-containing material in the presence of the applied magnetic field modifies a phase of iron nitride in the iron-nitride-containing material and a crystalline orientation of the iron nitride.

Clause 50: An apparatus configured to perform any one of the methods of clauses 1 to 49.

Clause 51: A material formed by the method of any one of clauses 1 to 49.

Clause 52: A bulk permanent magnet formed by the method of any one of claims 1 to 49.

EXAMPLES

Example 1

A bulk Fe—N pellet containing between about 8 atomic percent (at. %) and about 9 at. % N was synthesized using a cold crucible high temperature melting of iron in the presence of urea. Further details regarding cold crucible processing may be found, for example, in International Patent Application Number PCT/US2012/051382, filed on Aug. 17, 2012, and titled "IRON NITRIDE PERMANENT MAGNET AND TECHNIQUE FOR FORMING IRON NITRIDE PERMANENT MAGNET," the entire content of which is incorporated herein by reference. The Fe—N rod samples were about 10 millimeters (mm) in length, having a square cross-section of 1 mm per side. The surface of the rod was shiny, with no surface treatment having been applied during the following steps, with the nitrogen concentration measured by Auger Electron Spectroscopy (AES).

Figure 3:
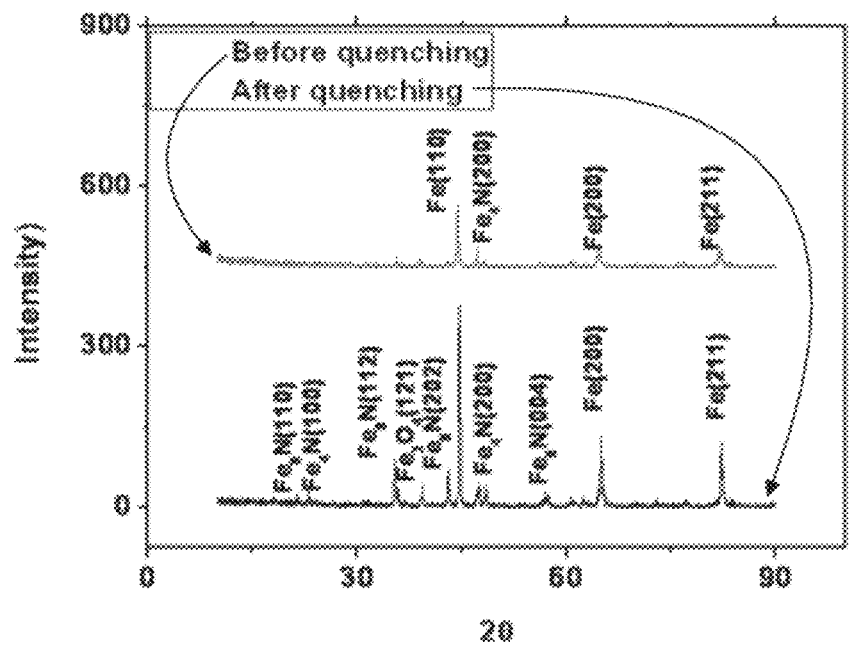
FIG. 3 is a chart illustrating x-ray diffraction spectra of an example Fe—N rod sample before and after quenching.

FIG. 3 is a chart illustrating x-ray diffraction spectra of Fe—N rod samples before solutionizing and quenching (upper spectrum) and after solutionizing at 660° C. for 4 h and quenching (lower spectrum). The strongest diffraction line in the upper spectrum is (110), which indicates the Fe—N bulk samples possess (110) preferred orientation. Before solutionizing and quenching, the sample is a solid mixture of Fe and N so that the main phase at this time is Fe. However, a small peak of $Fe_4N(200)$ appeared, as shown in the upper spectrum of FIG. 3, which was generated during Fe—N rod preparation.

The bulk Fe—N pellets were then solutionized at about 660° C. for about 4 hours and quenched in water. As shown in FIG. 3, the $Fe_8N$ phase appeared after quenching, with a 28% volume ratio calculated with respect to the $Fe_8N(202)$ peak. An oxide line, $Fe_3O_4(121)$, also appeared with a 6% volume ratio, arising from the preparation stage. The Fe volume ratio was estimated to be 54%, with the remaining 12% being $Fe_4N$. Therefore, after solutionizing and quenching, the FeN rod samples exhibit a mixture primarily of bcc Fe and body-centered tetragonal (bct) $Fe_8N$ phases.

Based on standard diffraction intensity data for an iron nitride powder sample without any orientation, the ratio of diffraction intensities between $Fe_8N(202)$ and $Fe_8N(112)$ peaks in an XRD spectrum should be 100:1; however, the ratio observed in the sample of this example was about 1:1.5. The observed ratio of diffraction intensities between $Fe_8N$ (202) and $Fe_8N(004)$ was nearly the same as the ratio predicted by the standard data for iron nitride powder. These observations indicate that the b axis lies out of the sample plane, while a and c axes lie in the sample plane.

The bulk Fe—N pellet samples were then annealed at about 150° C. for about 20 hours. For one sample, the annealing was performed without applying a magnetic field. For a second sample, the material was re-solutionized at 750° C. for 15 minutes in a 9 T magnetic field, quenched, stored in liquid N2 for 20 h to help promote $Fe_8N$ formation. Annealing to form $Fe_{16}N_2$ was then performed at 150° C. for 20 h with an applied field of about 9 T. The magnetic field was applied in plane in order to minimize the eddy current and the demagnetization factor.

Figure 4:
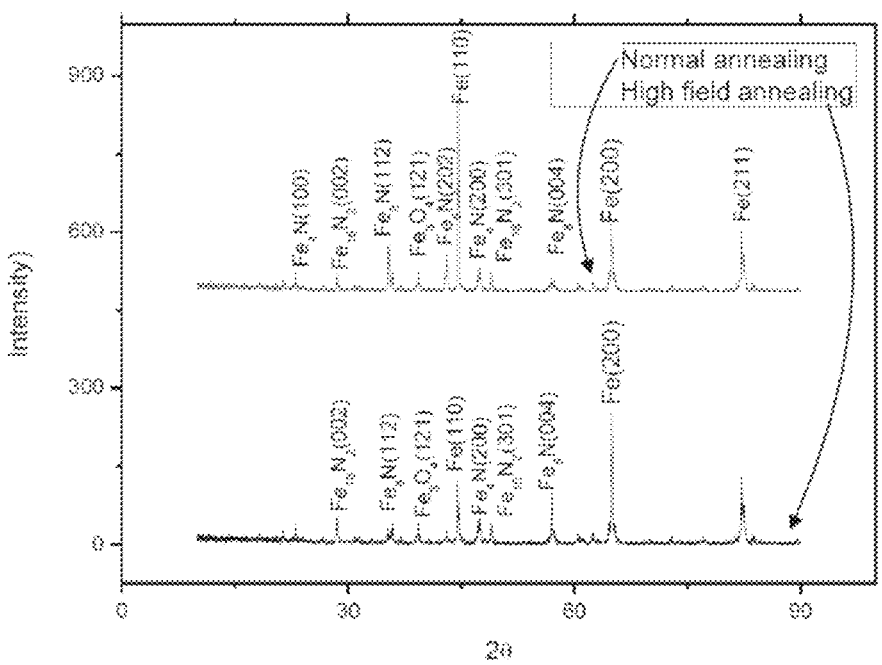
FIG. 4 is a chart illustrating x-ray diffraction spectra of an example Fe—N rod sample after annealing, with and without an applied high magnetic field.

FIG. 4 is a chart illustrating x-ray diffraction spectra of iron nitride rod samples after annealing, with and without an applied high magnetic field. Annealing without an applied magnetic field yielded a structure indicated by x-ray diffraction to include 54% iron, 10% of the highly magnetic ordered $Fe_{16}N_2$ phase 18% of disordered $Fe_8N$ phase, 12% $Fe_4N$ phase, and 6% $Fe_3O_4$ phase (top spectrum of FIG. 4).

FIG. 4 shows that annealing the iron nitride bulk material in the presence of the applied magnetic field modified the phase constitution and crystalline orientation of the iron nitride bulk material. The $Fe_{16}N_2$ content increased in the samples upon high field annealing, while both the $Fe_{16}N_2$ (002) and $Fe_8N$ (004) peaks increased in intensity. Table 1 presents data with respect to the iron nitride rod samples prepared by normal annealing without an applied high magnetic field, as compared to iron nitride rod samples prepared by annealing with an applied magnetic field. The total amount of $Fe_{16}N_2$ and $Fe_8N$ in the high field anneal sample (28%) matched the total $Fe_{16}N_2$ and $Fe_8N$ content of the sample annealed outside of the field (28%), which may suggest that solutionizing and quenching samples in a high magnetic field may not significantly affect the resulting Fe—N structure, as compared to solutionizing and quenching outside of a high magnetic field. However, the intensities of $Fe_8N$ and $Fe_{16}N_2$ compounds presented in the compared samples are different, which may be attributed to the influence of the applied high magnetic field during the 150° C. annealing step. The volume ratios of different elements or compounds with and without high field assistance are listed in Table 1.

TABLE 1

| | Volume ratio (Normal annealing) | Volume ratio (High field annealing) |
|---|---|---|
| Fe | 54% | 54% |
| $Fe_{16}N_2$ | 10% | 22% |
| $Fe_8N$ | 18% | 6% |
| $Fe_4N$ | 12% | 12% |
| $Fe_3O_4$ | 6% | 6% |

The data in Table 1 shows that the volume ratios of Fe, $Fe_4N$ and $Fe_3O_4$ remain the substantially same under the different annealing conditions. This consistency may indicate that additional solutionizing at about 750° C. under an applied high magnetic field followed by liquid nitrogen quenching (without such a field) has little or no influence on these phases, as compared to normal annealing in the present example. In some examples, additional solutionizing at about 750° C. in an applied high magnetic field may be beneficial for samples with higher nitrogen levels than the about 8 to about 9 at. % range of the present example, as the solutionizing in a high magnetic field may shift the phase equilibria to permit higher levels of N in the precursor austentic Fe phase, which can yield a higher yield percentage of $Fe_8N$ upon quenching.

However, the volume ratio of $\alpha''$-$Fe_{16}N_2$ phase after high field annealing at 150° C. for 20 h in the presence of a 9 T high magnetic field is higher than that by annealing at 150° C. for 20 h without a high magnetic field having been applied. The increment of the $\alpha''$-$Fe_{16}N_2$ phase may be derived from the $\alpha'$ $Fe_8N$ phase. The total volume ratio of $\alpha'$-$Fe_8N$ and $\alpha''$-$Fe_{16}N_2$ was about 28% after solutionizing and quenching (FIG. 3). After annealing without an applied magnetic field, the $\alpha'$-$Fe_8N$ and $\alpha''$-$Fe_{16}N_2$ phases are present in the sample at 18% and 10% by volume, respectively. This result indicates that only 35% (10/28) of $Fe_8N$ transformed into the $\alpha''$-$Fe_{16}N_2$ phase with annealing at 150° C. for 20 h without an applied magnetic field. On the other hand, for the sample annealed at about 150° C. for about 20 h in the presence of an applied magnetic field of 9 T, the $\alpha'$-$Fe_8N$ and $\alpha''$-$Fe_{16}N_2$ phases are present at 6% and 22% by volume respectively, corresponding to a 78% yield in (22/28) transforming from the $\alpha'$-$Fe_8N$ phase to the $\alpha''$-$Fe_{16}N_2$ phase. This result demonstrates that application of a high magnetic field during annealing promotes the phase transformation from $\alpha'$-$Fe_8N$ to $\alpha''$-$Fe_{16}N_2$.

As shown by the peak intensities of the spectra presented in FIG. 4, the effect of the applied high magnetic field on different phases present in the Fe—N rod samples may be categorized in three ways, namely, intensity enhancement, intensity decrement, and no difference, as listed in Table 2.

TABLE 2

| Phase (Intensity decreased after high field annealing) | Phase (Intensity enhanced after high field annealing) | Phase without difference |
|---|---|---|
| Fe (110) | Fe (200) | Fe (211) |
| $Fe_8N$ (112) | $Fe_{16}N_2$ (004) | $Fe_{16}N_2$ (301) |
| $Fe_8N$ (202) | $Fe_{16}N_2$ (002) | $Fe_4N$ (200) |
| | | $Fe_3O_4$ (121) |
| | | $Fe_4N$ (100) |

Figure 5:
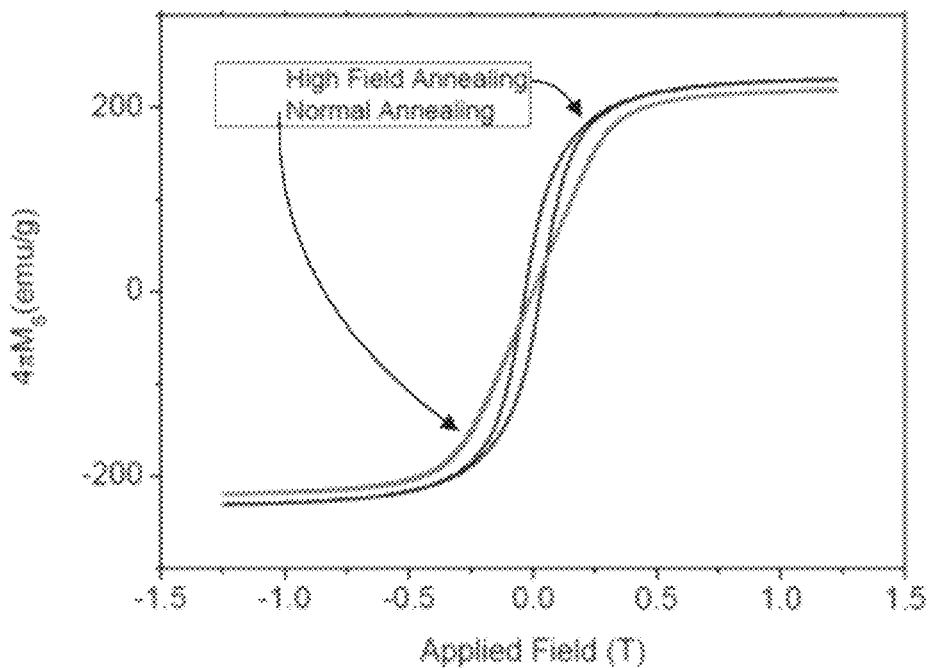
FIG. 5 is a chart illustrating magnetization curves of an example bulk Fe—N rod sample, measured by a SQUID at room temperature after annealing with and without an applied 9 T magnetic field.

FIG. 5 is a chart illustrating magnetization curves of bulk Fe—N rod samples, measured by a superconducting quantum interference device (SQUID) magnetometer at room temperature after 150° C. annealing for 20 h with and without an applied 9 T high magnetic field. The magnetization curves were measured at 300 K using the SQUID magnetometer (Quantum Design MPMS-XP) in a magnetic field of $-2$ T$\leq$B$\leq+2$ T, where B is the magnetic induction or magnetic flux density. The sample weights were determined with an ultra-micro balance (Mettler UMT-2). As shown in FIG. 5, the saturation magnetization of the iron nitride material annealed without an applied magnetic field, measured at room temperature, was about 218 emu/g, which is in excess of that of pure Fe, but the coercivity was very low, with a value of only about 45 Oe. The iron nitride annealed in the presence of an applied magnetic field has enhanced magnetic properties compared the sample annealed in the absence of an applied magnetic field, as shown in FIG. 5. The saturation magnetization ($M_s$) of the sample annealed in the presence of a 9 T magnetic field increased to 227 emu/g, and the coercivity increased to about 376 Oe. Table 3 summarized the results illustrated in FIG. 5.

TABLE 3

| | Normal Annealing | Magnetic Field Annealing |
|---|---|---|
| $M_s$ (emu/g) | 218 | 227 |
| Coercivity (Oe) | 45 | 376 |

Figure 6:
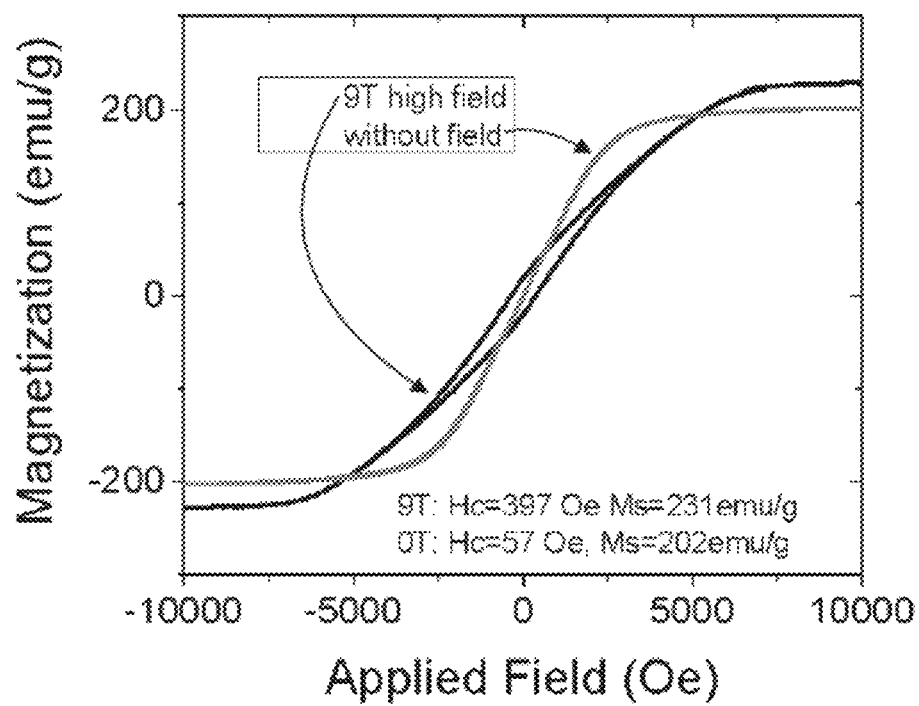
FIG. 6 is a chart illustrating magnetization curves of example bulk Fe—N rod samples, measured by a SQUID after annealing with and without an applied 9 T magnetic field.

FIG. 6 is a chart illustrating magnetization curves of bulk Fe—N rod samples, measured by a SQUID magnetometer at room temperature. The samples presented in the chart of FIG. 6 were manufactured according to the same methods described with respect to FIGS. 3-5, with the Fe—N rod samples being solutionized at about 660° C. for 4 h and quenched. One sample was annealed at 160° C. for 20 h with no applied magnetic field, while another sample was annealed at 160° C. for 20 with an applied 9 T magnetic field. The magnetization curves were measured at 300 K using the SQUID magnetometer (Quantum Design MPMS-XP) in a magnetic field cycling between -10,000 Oe and +10,000 Oe. The sample weights were determined with an ultra-micro balance (Mettler UMT-2). As shown in FIG. 4, the saturation magnetization of the iron nitride material annealed without an applied magnetic field, measured at room temperature, was about 202 emu/g, with coercivity of 57 Oe. The Fe—N rod sample annealed in the presence of an applied 9 T magnetic field showed an increased coercivity ($H_c$) of 397 Oe, and an increased $M_s$ of 231 emu/g. These results illustrate the beneficial effect of 9 T annealing for improved conversion of $Fe_8N$ to $Fe_{16}N_2$ with increased saturation magnetization and coercivity properties in a bulk form Fe—N magnet. This high magnetic field annealing technique can be applied to Fe—N materials made by other methods, which may yield higher initial fractions of $Fe_8N$ phase than the examples presented herein, with enhanced conversion of $Fe_8N$ to the desired $Fe_{16}N_2$ magnetic phase.

Figure 7:
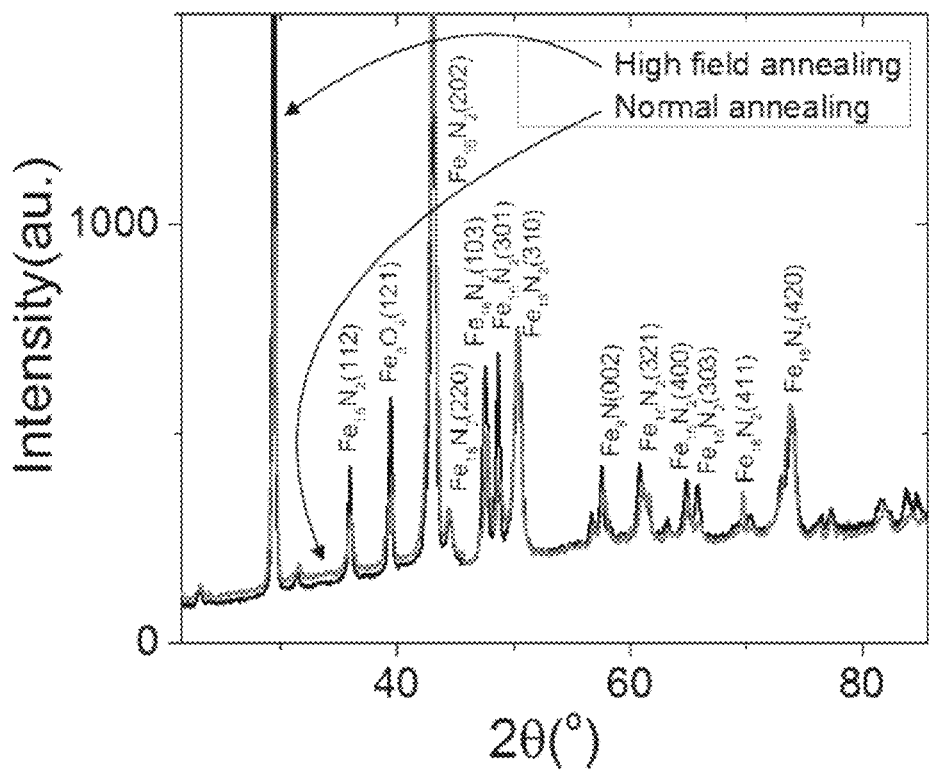
FIG. 7 is a chart illustrating x-ray diffraction spectra of example Fe—N rod samples after annealing, with and without an applied high magnetic field.

FIG. 7 is a chart illustrating x-ray diffraction spectra of example Fe—N rod samples after annealing, with and without an applied high magnetic field. The spectra shown in FIG. 7 were taken from Fe—N rod samples prepared according to a method similar to that described with respect to the samples of FIGS. 3-5. The Fe—N rod samples shown in FIG. 7 were solutionized at about 660° C. for about 4 hours then quenched. One sample was annealed at about 160° C. for about 20 hours with no applied magnetic field (the upper spectrum of FIG. 7, at the point of the x axis equaling zero). Another sample was annealed at about 160° C. for about 20 hours with an applied 9 T magnetic field (the lower spectrum of FIG. 7, at the point of the x axis equaling zero). The spectra of the Fe—N rod samples shown in FIG. 7 also include a strain effect. For example, a strain energy accumulated inside the Fe—N rods may suppress further progress of the phase transformation from α'-Fe$_8$N to α"-Fe$_{16}$N$_2$ to some degree, yet contribute to an increase in the saturation magnetization of the samples.

These examples show that annealing in the presence of a 9 T applied magnetic field may enhance magnetic properties of bulk FeN rod samples by modifying the phase constitution and crystalline orientation of the rod samples after annealing. The yield of phase transformation from α'-Fe$_8$N to α"-Fe$_{16}$N$_2$ was increased to 78% by annealing in the presence of the applied magnetic field. There are four different phases and three phase transformations during preparation of α"-Fe$_{16}$N$_2$, namely α→γ→α'→α". Applied magnetic fields have been used to increase the fraction of the α' phase transformed from γ phase. In this disclosure, the effect of ultra-high field annealing on the α'→α" phase transformation is demonstrated. The final percentage of α" may depend on the transforming rate of γ→α' and α'→α". An applied magnetic field can improve the transformation of γ→α' to 92%. Based on the transformation efficiency from γ→α' and from α'→α", it is anticipated that a volume percentage of α" of 72% may be obtained an applied magnetic field is used during both transformations.

While not wishing to be bound by any theory, the mechanism of the magnetic field effects on the FeN phase formation may be understood based on the free energy of the material. At the beginning α' phase, nitrogen atoms are arranged in a disordered manner on octahedral sites along the c axis of the iron crystal. The phase transformation into α" corresponds to nitrogen having reassembled in an ordered manner. However, the transformation may not occur easily due to the strain effect. In this example, strain effect means an accumulation of strain energy inside of the sample, which can suppress any further progress of the phase transformation. For iron nitride material, the main contribution of strain energy accumulation comes from the quenching stage, since the martensitic transformation from fcc to bct includes an accompanying atomic volume increase. This accumulation of strain energy may hinder the following α'→α" transformation. In fact, the rate of transformation from α'→α" under any reported annealing process without an applied magnetic field may be only 35%.

The direction of the strain effect is related to the matrix orientation. As shown in FIG. 3, the main matrix orientation is (110). Analysis of relative intensities of different peaks indicates that the b axis lies out of the sample plane, while the a and c axes lie in the sample plane. Accordingly, the in-plane 9 T field is perpendicular to the b axis. This may account for the decrease of Fe(110) intensity and increase of Fe(200) during annealing, as shown in FIG. 4. Based on the above analysis, an applied high magnetic field in the plane can reduce the strain effect and therefore, increase α'→α" transformation. Since the magnetic field was aligned with the FeN(001) orientation, Gibbs free energy on the elongated c axis is decreased and assists in Fe$_{16}$N$_2$(004) and Fe$_{16}$N$_2$(002) phase formation.

Example 2

Figure 8A:
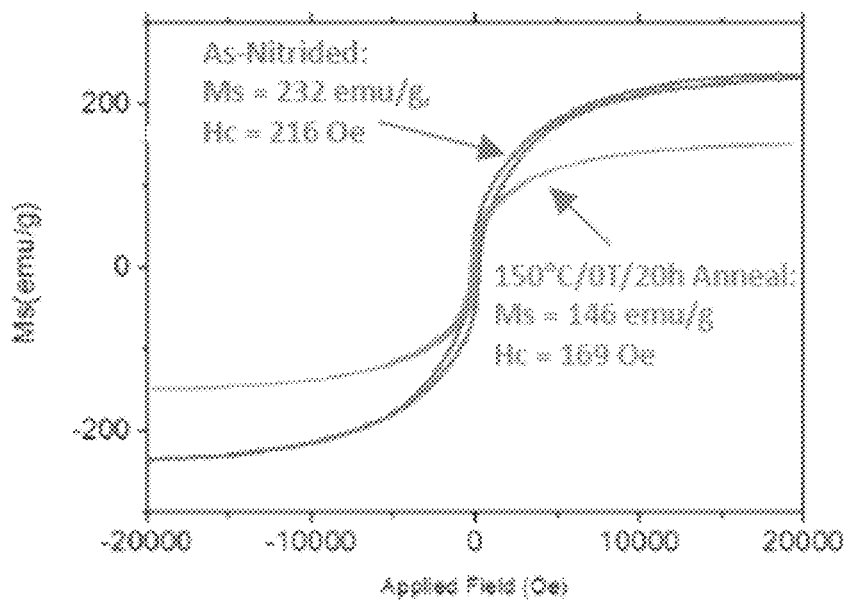
FIG. 8A is a chart illustrating magnetization curves of an example as-nitrided $Fe_{16}N_2$-based nanoscale powder, measured at room temperature before and after annealing.

A nanoscale powder based on the Fe$_{16}$N$_2$ phase (70% Fe$_{16}$N$_2$, 17% Fe, and 13% Fe$_x$(C,N) where x=2 to 4) was synthesized by reduction of nominal 25 nm carbon coated Fe powder at about 390° C. for about 1 hour while exposing the powder to hydrogen gas, followed by NH$_3$ nitridation at about 160° C. for about 21 hours. This material yielded a room temperature saturation magnetization ($M_s$) value of about 232 emu/g and a coercivity of about 216 Oe. Annealing this powder at about 150° C. for about 20 hours in vacuum resulted in a decrease in saturation magnetization to about 146 emu/g, a decrease of nearly 40%, and a coercivity of about 169 Oe. FIG. 8A is a chart illustrating magnetization curves of the example Fe$_{16}$N$_2$-based nanoscale powder, measured at room temperature before and after annealing.

Figure 8B:
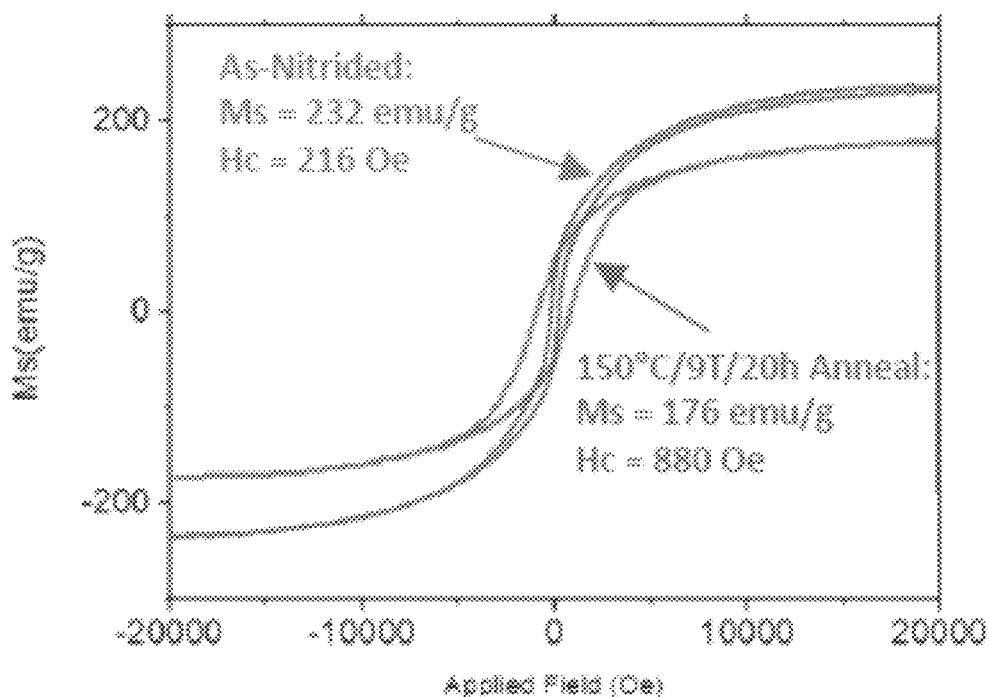
FIG. 8B is a chart illustrating magnetization curves of an example as-nitrided $Fe_{16}N_2$-based nanoscale powder, measured at room temperature before and after annealing with an applied 9 T magnetic field.

A similar nanoscale iron nitride powder was annealed in vacuum at about 150° C. for about 20 hours while being exposed to a 9 T magnetic field. FIG. 8B is a chart illustrating magnetization curves of the example Fe$_{16}$N$_2$-based nanoscale powder, measured at room temperature before and after annealing with the applied 9 T magnetic field. Annealing in the presence of the magnetic field resulted in an approximately four-fold increase in coercivity over the as-nitrided starting powder, and a quintuple increase over the powder annealed without the magnetic field, to 880 Oe, as shown at FIG. 8B. Although the saturation magnetization ($M_s$) decreased by about 25% from the saturation magnetization of the as-nitrided material, this decrease is compensated for by the increase in coercivity.

Example 3

Figure 9A:
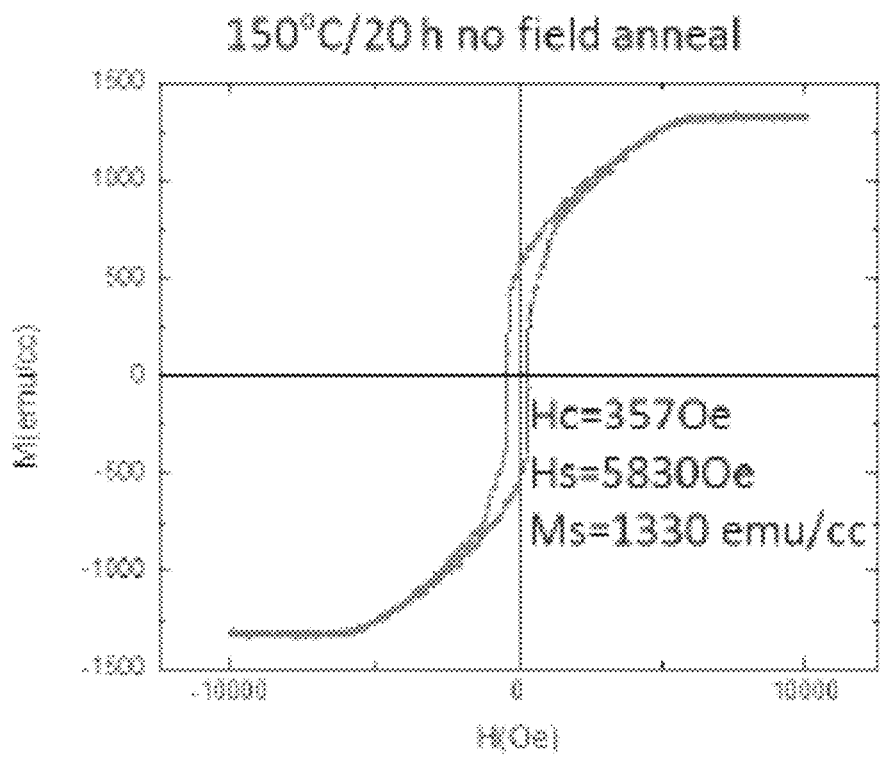
FIG. 9A is a chart illustrating a magnetization curve of an example gallium arsenide substrate coated with films of iron, silver and iron nitride, measured at room temperature after annealing.

A three layer thin film was deposited on a gallium arsenide (GaAs) substrate using reactive sputtering. The three layers included a first layer including iron with a thickness of about 5 nm, a second layer including silver with a thickness of about 40 nm and a third, top layer including iron nitride with a thickness of about 20 nm. The top layer of iron nitride may form as Fe$_8$N as the layer quenches during deposition on the example (or any other) substrate. One sample was annealed at about 150° C. for about 20 hours, without being exposed to an applied magnetic field. FIG. 9A is a chart illustrating a magnetization curve of a gallium arsenide substrate coated with films of iron, silver and iron nitride, measured at room temperature after annealing. Values of $M_s$=1330 emu/cc, $H_s$=5830 Oe, and $H_c$=357 Oe were obtained.

Figure 9B:
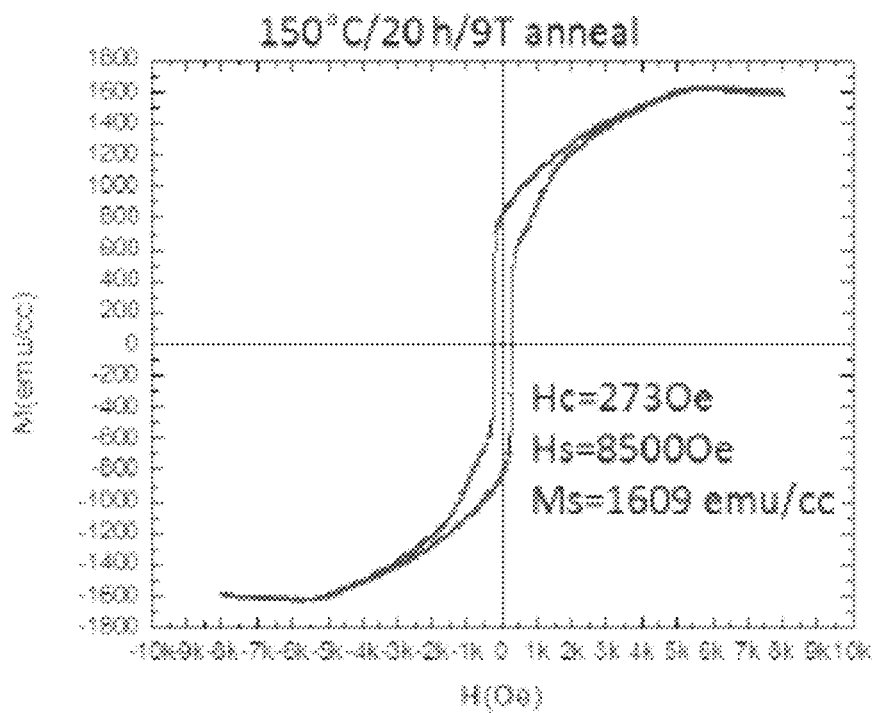
FIG. 9B is a chart illustrating a magnetization curve of an example gallium arsenide substrate coated with films of iron, silver and iron nitride, measured at room temperature after annealing with an applied 9 T high magnetic field.

A second thin film sample, prepared as described above in this Example, was annealed at about 150° C. for about 20 hours while being exposed to an applied magnetic field of about 9 T. FIG. 9B is a chart illustrating a magnetization curve of a gallium arsenide substrate coated with films of iron, silver and iron nitride, measured at room temperature after annealing with an applied 9 T high magnetic field. Values of $M_s$=1609 emu/cc, $H_s$=8500 Oe, and $H_c$=273 Oe were obtained, as shown at FIG. 9B.

Figure 9C:
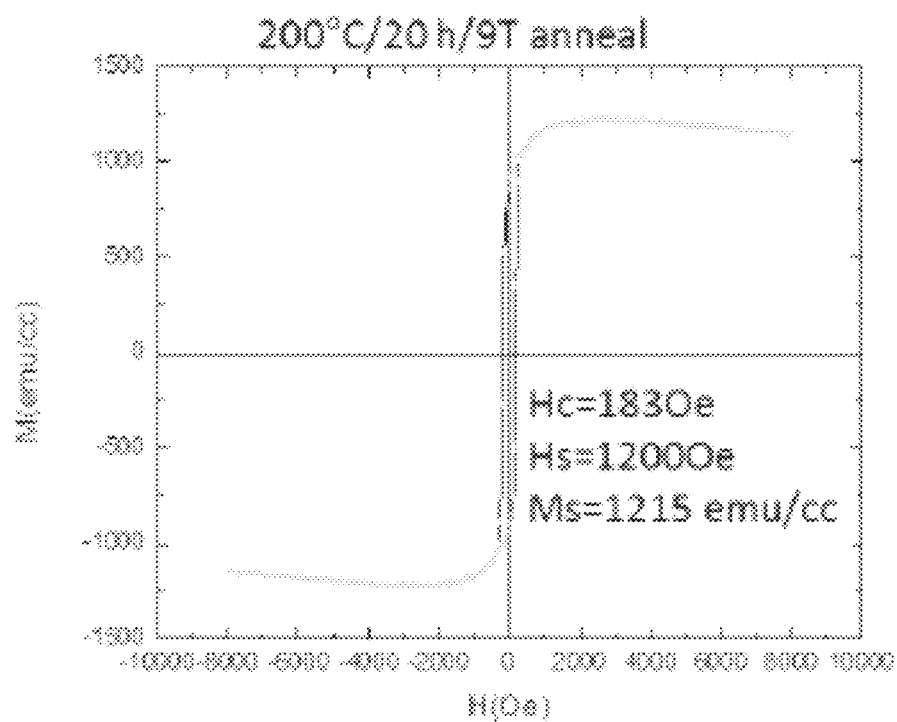
FIG. 9C is a chart illustrating a magnetization curve of an example gallium arsenide substrate coated with films of iron, silver and iron nitride, measured at room temperature after annealing with an applied 9 T high magnetic field at a temperature higher than the example thin-film structure of FIG. 9B.

FIG. 9C is a chart illustrating a magnetization curve of a gallium arsenide substrate coated with films of iron, silver and iron nitride, prepared as described above in this Example and measured at room temperature after annealing with an applied 9 T high magnetic field at a temperature higher than the example thin-film structure of FIG. 9B. When a third sample was annealed at higher temperature, about 200° C., for about 20 hours while being exposed to an applied magnetic field of about 9 T, the magnetic properties of the materials degraded, due to thermal breakdown of the Fe$_{16}$N$_2$ phase (see FIG. 9C). In this example, values of $M_s$=1215 emu/cc, $H_s$=1200 Oe, and $H_c$=183 Oe were obtained Overall, these examples illustrate that synthesis of iron nitride based magnetic materials within an applied magnetic field, or annealing of iron nitride magnetic materials in an applied magnetic field, can significantly enhance both $Fe_{16}N_2$ content and coercivity, resulting in iron nitride magnetic materials with improved energy products.

Example 4

Figure 10:
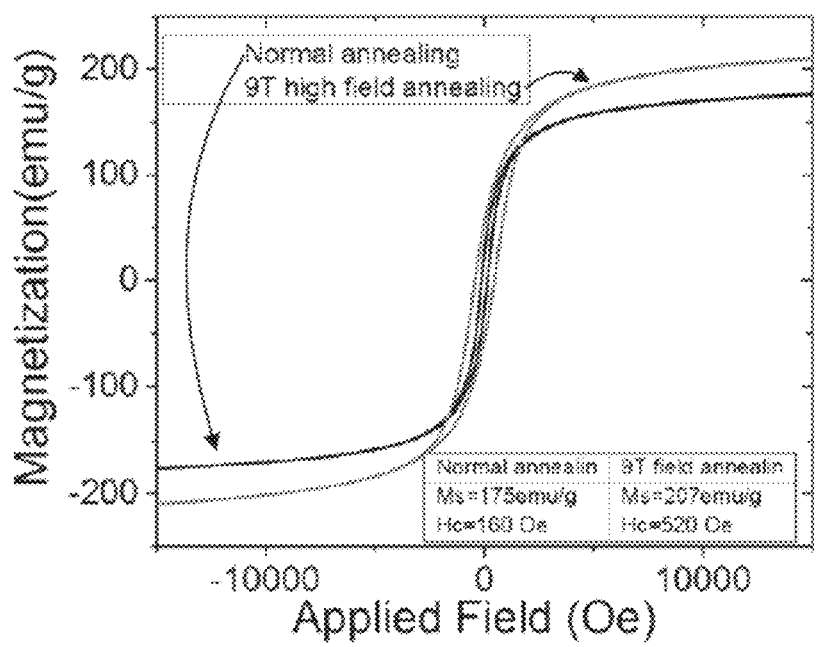
FIG. 10 is a chart illustrating a magnetization curve of an example iron nitride sample prepared by ball milling, nitriding, and annealing with and without an applied 9 T high magnetic field.
Figure 11:
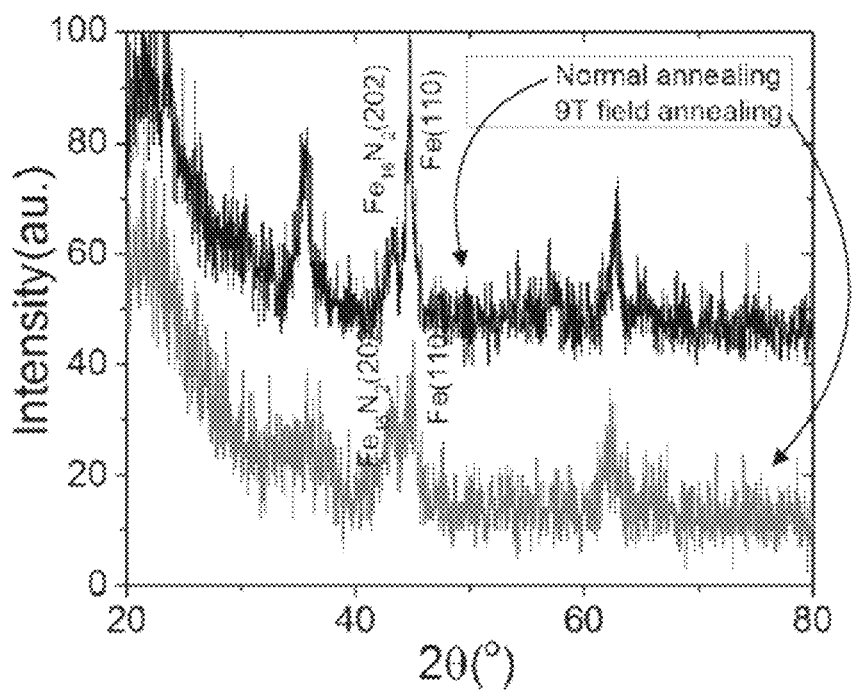
FIG. 11 is a chart x-ray diffraction spectra of example Fe—N material after annealing, with and without an applied 9 T high magnetic field.

A powder based on the $Fe_{16}N_2$ phase was synthesized by ball milling (in a Retsch® Planetary Ball Mill PM 100 available from Verder Scientific Inc., Haan, Germany) iron powder with an average particle diameter between about 30 micrometers and 40 micrometers in the presence of ammonium nitride for about 60 hours to nitridize the iron particles. Some particles were annealed at a temperature of about 160° C. for about 24 hours without applying a magnetic field, while some particles were annealed at a temperature of about 160° C. for about 24 hours while a 9 T magnetic field was applied. FIG. 10 is a chart illustrating a magnetization curve of an example iron nitride sample prepared by ball milling, nitriding, and annealing with and without an applied 9 T high magnetic field. As FIG. 10 illustrates, the particles annealed without an applied magnetic field had a coercivity of about 160 Oe and a $M_s$ value of about 175 emu/g. The particles annealed in the presence an applied 9 T magnetic field had a coercivity of about 520 Oe and a $M_s$ value of about 207 emu/g. FIG. 11 is a chart x-ray diffraction spectra of example Fe—N material after annealing, with and without an applied 9 T high magnetic field.

Various examples have been described. These and other examples are within the scope of the following claims.

The invention claimed is:

1. A method comprising:
solutionizing a material including iron, nitrogen, and at least one dopant, in the presence of an applied magnetic field with a strength of at least about 0.2 T at a temperature of about 660° C. or more; and
after solutionizing the material, quenching the material;
annealing the material to form an iron nitride material with at least one $Fe_{16}N_2$ phase domain, wherein the applied magnetic field has a strength of at least about 0.2 Tesla (T), wherein the at least one dopant comprises at least one of Al, Mn, La, Cr, Co, Ti, Ni, or a rare earth metal.

2. The method of claim 1, wherein the strength of the magnetic field in the annealing step is greater than about 2.5 T.

3. The method of claim 1, wherein the strength of the magnetic field in the annealing step is between about 8 T and about 10 T.

4. The method of claim 1, wherein the strength of the magnetic field in the annealing step is greater than about 9 T.

5. The method of claim 1, wherein annealing the material comprises heating the material at a temperature of between about 120° C. to about 200° C. for between about 10 hours and about 100 hours.

6. The method of claim 5, wherein annealing the material comprises heating the material at a temperature between about 150° C. and about 160° C. for between about 10 hours and about 30 hours.

7. The method of claim 1, wherein the material comprises at least one of a pellet, rod, thin film, nanoparticle, powder, or nanoscale powder.

8. The method of claim 1, wherein the at least one dopant comprises at least one of B, C, P, Si, or O.

9. The method of claim 1, wherein annealing the material in the presence of the applied magnetic field transforms an $\alpha'$-$Fe_8N$ phase in the material to an $\alpha''$-$Fe_{16}N_2$ phase.

10. The method of claim 9, wherein a transformation yield of the $\alpha'$-$Fe_8N$ phase to the $\alpha''$-$Fe_{16}N_2$ phase is at least 70%.

11. The method of claim 1, wherein, after annealing, the $\alpha''$-$Fe_{16}N_2$ phase in the material is at least 20% of the material by volume.

12. The method of claim 1, wherein the applied magnetic field is applied in substantial alignment with a c axis of at least one iron crystal in the material.

13. The method of claim 1, wherein solutionizing the material comprises solutionizing the material in the presence of an applied magnetic field with a strength of at least about 9 T magnetic field at about 750° C.

14. The method of claim 1, wherein, prior to annealing the material, the concentration of nitrogen in the material is between about 8 atomic percent (at. %) and about 9 at. %.

15. A method comprising:
nitridizing a material including iron in the presence of an applied magnetic field to form an iron-nitride-containing material at a temperature of about 600° C. or more;
and annealing the iron-nitride-containing material in the presence of the applied magnetic field to form at least one $Fe_{16}N_2$ phase domain, wherein the applied magnetic field has a strength of at least about 0.2 Tesla (T), wherein the iron-nitride-containing material comprises at least one dopant selected from Al, Mn, La, Cr, Co, Ti, Ni, or a rare earth metal in the iron nitride material.

16. The method of claim 15, wherein the material including iron comprises an iron-based powder or iron-based nanoscale powder.

17. The method of claim 15, wherein the material comprises at least one of an iron oxide, iron carbide, iron chloride, or iron-metal solid solution.

18. The method of claim 15, wherein nitridizing the material and annealing the iron-nitride-containing material to form at least one $Fe_{16}N_2$ phase domain occur in situ in the presence of the applied magnetic field.

19. The method of claim 15, further comprising, prior to nitridizing the material, reducing the material in at least one of hydrogen, nitrogen, or ammonia gas, wherein reduction of the material occurs in situ in the presence of the applied magnetic field.

20. The method of claim 19, wherein reducing the material comprises reducing a carbon-coated iron powder in hydrogen gas for about 1 hour at a temperature of between about 375° C. and about 425° C.

21. The method of claim 15, wherein the strength of the high magnetic field is greater than about 2.5 T.

22. The method of claim 15, wherein the strength of the high magnetic field is between about 8 T and about 10 T.

23. The method of claim 15, wherein the strength of the high magnetic field is greater than about 9 T.

24. The method of claim 15, wherein annealing the iron-nitride-containing material comprises heating the iron-nitride-containing material at a temperature of between about 100° C. to about 250° C. for between about 10 hours and about 100 hours.

25. The method of claim 15, wherein the at least one dopant comprises at least one of B, C, P, Si, or O.

26. The method of claim 15, wherein annealing the iron-nitride-containing material in the presence of the applied magnetic field transforms an $\alpha'$-$Fe_8N$ phase in the iron-nitride-containing material to an $\alpha''$-$Fe_{16}N_2$ phase.

27. The method of claim 26, wherein a transformation yield of the α'-Fe$_8$N phase to the α"-Fe$_{16}$N$_2$ phase is at least 70%.

28. The method of claim 15, wherein, after annealing, the α"-Fe$_{16}$N$_2$ phase in the iron-nitride-containing material is at least 20% of the iron-nitride-containing material by volume.

29. The method of claim 15, wherein the applied magnetic field is applied in substantial alignment with a c axis of at least one iron crystal in the iron-nitride-containing material.

30. A workpiece comprising iron nitride material made by solutionizing a material including iron and nitrogen at a temperature of about 600° C. or more, and annealing the material in the presence of an applied magnetic field to form at least one Fe$_{16}$N$_2$ phase domain, wherein the applied magnetic field has a strength of at least about 0.2 Tesla (T), wherein the iron and nitrogen containing material comprises at least one dopant selected from Al, Mn, La, Cr, Co, Ti, Ni, or a rare earth metal in the iron nitride material.

31. The work piece of claim 30, wherein the workpiece is a pellet, rod, thin film, nanoparticle, powder, or nanoscale powder.

32. An article comprising a plurality of workpieces, wherein at least one workpiece of the plurality of workpieces comprise iron nitride material made by the method of claim 1, and wherein the at least one workpiece is a pellet, rod, thin film, nanoparticle, powder, or nanoscale powder.

33. The article of claim 32, wherein the workpieces are arranged so the <001> axes of the respective iron nitride materials are substantially aligned.

34. The article of claim 33, wherein the article is an electric motor, a generator, a sensor, an actuator, a component of an automotive vehicle, or a component of a wind turbine.

* * * * *